US012604250B2

(12) United States Patent
Araujo et al.

(10) Patent No.: US 12,604,250 B2
(45) Date of Patent: Apr. 14, 2026

(54) CLI REPORTING FOR HANDOVER

(71) Applicant: Telefonaktiebolaget LM Ericsson (publ), Stockholm (SE)

(72) Inventors: Lian Araujo, Solna (SE); Icaro Leonardo Da Silva, Solna (SE); Jonas Sedin, Brentford (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 263 days.

(21) Appl. No.: 18/265,089

(22) PCT Filed: Dec. 3, 2021

(86) PCT No.: PCT/SE2021/051199
§ 371 (c)(1),
(2) Date: Jun. 2, 2023

(87) PCT Pub. No.: WO2022/119496
PCT Pub. Date: Jun. 9, 2022

(65) Prior Publication Data
US 2024/0007924 A1      Jan. 4, 2024

Related U.S. Application Data

(60) Provisional application No. 63/121,653, filed on Dec. 4, 2020.

(51) Int. Cl.
*H04W 36/30*      (2009.01)
*H04W 36/00*      (2009.01)
*H04W 36/20*      (2009.01)

(52) U.S. Cl.
CPC ....... *H04W 36/30* (2013.01); *H04W 36/0058* (2018.08); *H04W 36/0085* (2018.08); *H04W 36/20* (2013.01)

(58) Field of Classification Search
CPC .............. H04W 36/30; H04W 36/362; H04W 36/0058; H04W 36/0085; H04W 36/20;
(Continued)

(56) References Cited

U.S. PATENT DOCUMENTS

| 11,792,670 B2 * | 10/2023 | Jin | ........................ | H04L 1/0026 |
| | | | | 370/329 |
| 2014/0241250 A1 * | 8/2014 | Jung | ..................... | H04W 48/16 |
| | | | | 370/328 |

(Continued)

OTHER PUBLICATIONS

Author Unknown, "Technical Specification Group Radio Access Network; Study on New Radio Access Technology Physical Layer Aspects (Release 14)," Technical Report 38.802, Version 14.2.0, Sep. 2017, 3GPP Organizational Partners, 145 pages.
(Continued)

*Primary Examiner* — Mohamed A Kamara
(74) *Attorney, Agent, or Firm* — Withrow & Terranova, PLLC

(57) ABSTRACT

Systems and methods of the present disclosure are directed to a method performed by a wireless device for Cross-Link Interference (CLI) reporting. The method includes storing a CLI measurement. The method includes receiving a request to report the CLI measurement from a network node involved in a handover procedure for the wireless device. The method includes transmitting a CLI measurement report to the network node based on the CLI measurement.

19 Claims, 11 Drawing Sheets

(58) Field of Classification Search
CPC ............. H04W 36/24; H04W 36/0079; H04W
36/0083; H04W 36/305; H04W 24/10;
H04W 92/18; H04B 7/309; H04B 7/336;
H04B 7/345
See application file for complete search history.

(56) References Cited

U.S. PATENT DOCUMENTS

| | | | |
|---|---|---|---|
| 2018/0323916 A1 | 11/2018 | Yang et al. | |
| 2021/0006438 A1* | 1/2021 | Harrebek | H04W 24/10 |
| 2023/0057616 A1* | 2/2023 | Xu | H04B 17/336 |

OTHER PUBLICATIONS

Author Unknown, "Technical Specification Group Radio Access Network; NR; Physical layer procedures for control (Release 15)," Technical Specification 38.213, Version 15.5.0, Mar. 2019, 3GPP Organizational Partners, 104 pages.

Author Unknown, "Technical Specification Group Radio Access Network; NR; Physical layer procedures for control (Release 16)," Technical Specification 38.213, Version 16.3.0, Sep. 2020, 3GPP Organizational Partners, 179 pages.

Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 529 pages.

Author Unknown, "Technical Specification Group Radio Access Network; NR; Radio Resource Control (RRC) protocol specification (Release 16)," Technical Specification 38.331, Version 16.0.0, Mar. 2020, 3GPP Organizational Partners, 835 pages.

Ericsson, "R2-20xxxx: [108#28] [R16 RRC] 38331 Rel-16 CR Merge," 3GPP TSG-RAN WG2 Meeting #109, Feb. 24-28, 2020, Athens, Greece, 794 pages.

Nokia, et al., "R1-1902672: Details of UE CLI measurements," 3GPP TSG-RAN#96, Feb. 25-Mar. 1, 2019, Athens, Greece, 9 pages.

International Search Report and Written Opinion for International Patent Application No. PCT/SE2021/051199, mailed Mar. 4, 2022, 10 pages.

Examination Report for European Patent Application No. 21824108. 1, mailed Dec. 18, 2025, 6 pages.

* cited by examiner

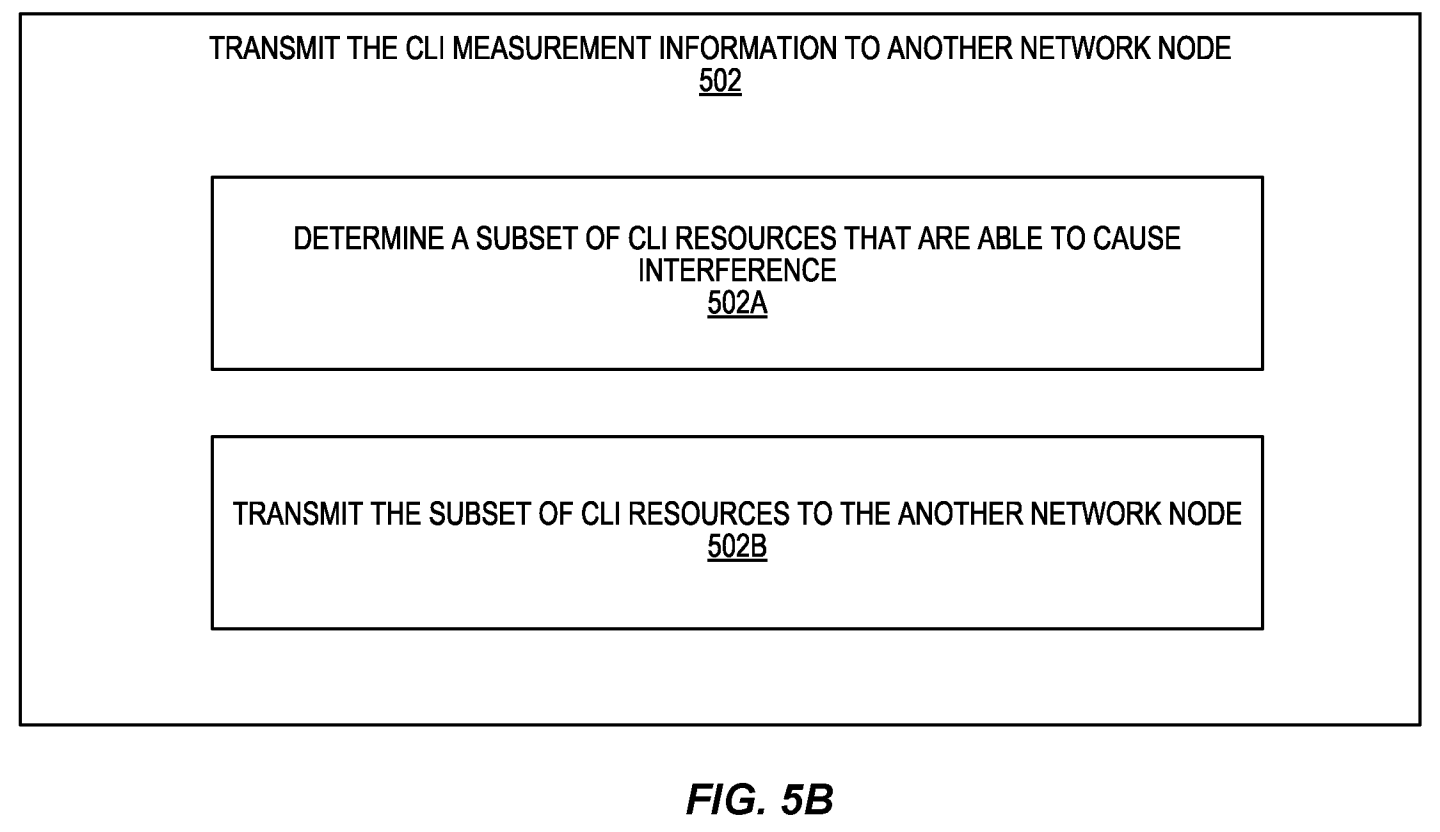

TRANSMIT THE CLI MEASUREMENT INFORMATION TO ANOTHER NETWORK NODE
502

DETERMINE A SUBSET OF CLI RESOURCES THAT ARE ABLE TO CAUSE INTERFERENCE
502A

TRANSMIT THE SUBSET OF CLI RESOURCES TO THE ANOTHER NETWORK NODE
502B

*FIG. 5B*

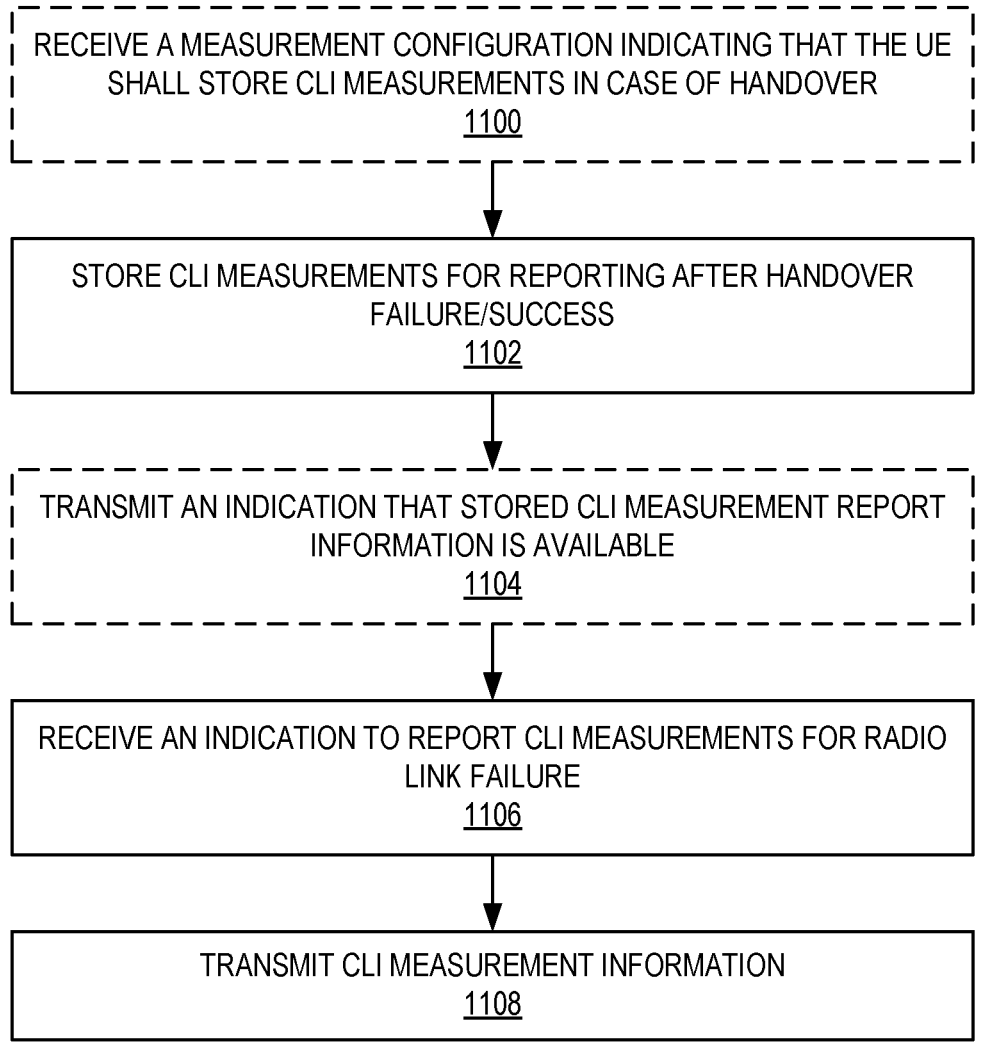

RECEIVE A MEASUREMENT CONFIGURATION INDICATING THAT THE UE SHALL STORE CLI MEASUREMENTS IN CASE OF HANDOVER
1100

STORE CLI MEASUREMENTS FOR REPORTING AFTER HANDOVER FAILURE/SUCCESS
1102

TRANSMIT AN INDICATION THAT STORED CLI MEASUREMENT REPORT INFORMATION IS AVAILABLE
1104

RECEIVE AN INDICATION TO REPORT CLI MEASUREMENTS FOR RADIO LINK FAILURE
1106

TRANSMIT CLI MEASUREMENT INFORMATION
1108

*FIG. 11*

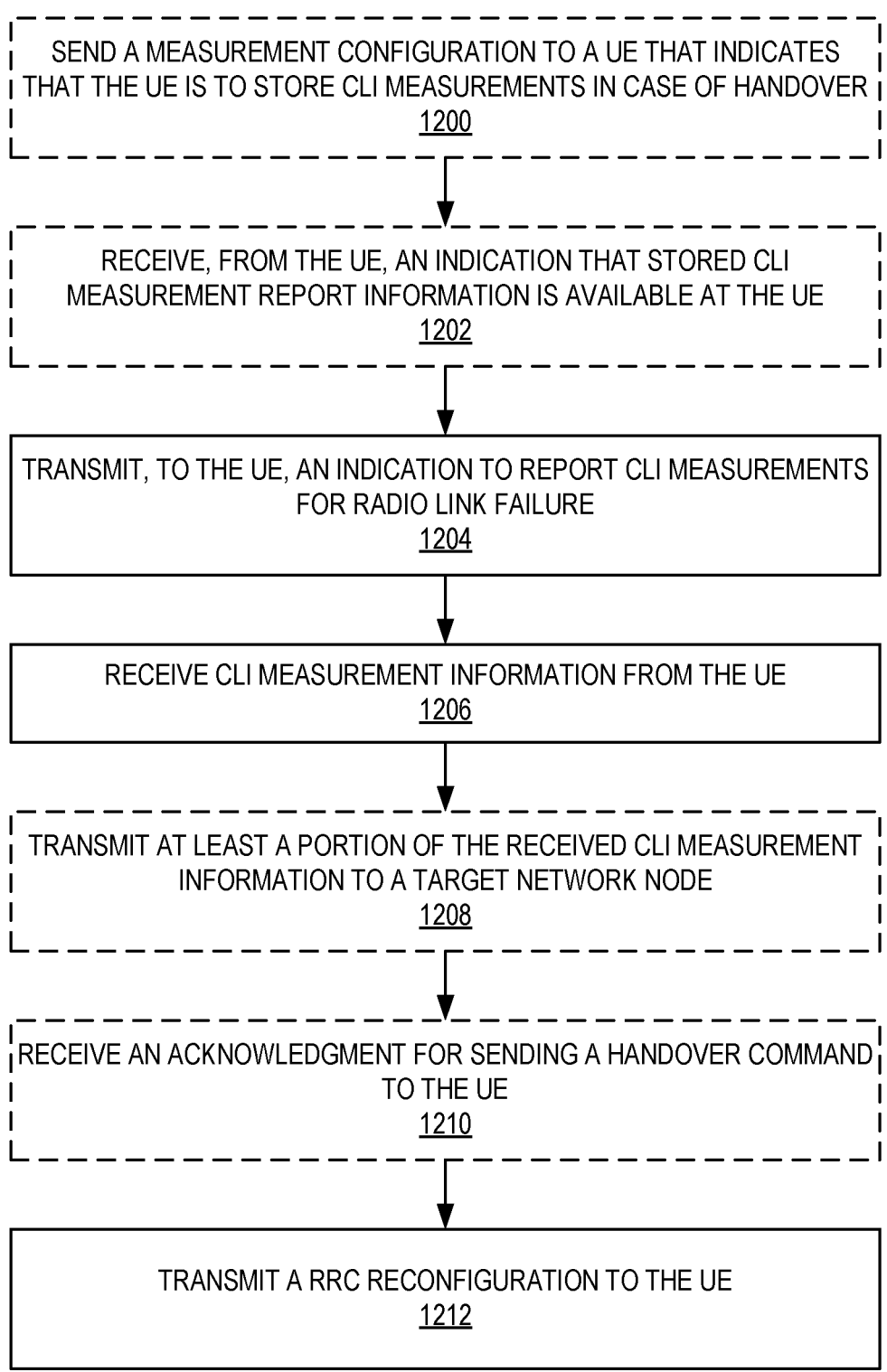

SEND A MEASUREMENT CONFIGURATION TO A UE THAT INDICATES THAT THE UE IS TO STORE CLI MEASUREMENTS IN CASE OF HANDOVER
1200

RECEIVE, FROM THE UE, AN INDICATION THAT STORED CLI MEASUREMENT REPORT INFORMATION IS AVAILABLE AT THE UE
1202

TRANSMIT, TO THE UE, AN INDICATION TO REPORT CLI MEASUREMENTS FOR RADIO LINK FAILURE
1204

RECEIVE CLI MEASUREMENT INFORMATION FROM THE UE
1206

TRANSMIT AT LEAST A PORTION OF THE RECEIVED CLI MEASUREMENT INFORMATION TO A TARGET NETWORK NODE
1208

RECEIVE AN ACKNOWLEDGMENT FOR SENDING A HANDOVER COMMAND TO THE UE
1210

TRANSMIT A RRC RECONFIGURATION TO THE UE
1212

*FIG. 12*

CLI REPORTING FOR HANDOVER

RELATED APPLICATIONS

This application is a 35 U.S.C. § 371 national phase filing of International Application No. PCT/SE2021/051199, filed Dec. 3, 2021, which claims the benefit of provisional patent application Ser. No. 63/121,653, filed Dec. 4, 2020, the disclosures of which are hereby incorporated herein by reference in their entireties.

TECHNICAL FIELD

The present disclosure relates to Cross-link Interference (CLI) reporting and, more specifically, provision of CLI reporting during handover scenarios.

BACKGROUND

Cross-Link Interference (CLI)

Fifth Generation (5G) New Radio (NR) communications systems support flexible Downlink (DL)/Uplink (UL) transmission directions in both paired and unpaired spectrum. In paired spectrum, there is dedicated frequency for DL and for UL (typically using Frequency Division Duplexing (FDD)). In unpaired spectrum, there is a single carrier frequency for DL and UL (typically using Time Division Duplexing (TDD)). As an example, text from section 5.1 of the Third Generation Partnership Project (3GPP) Technical Report (TR) 38.802, v. 14.2.0, "Study on new radio access technology Physical layer aspects", Rel. 14 (09-2017) is reproduced below:

*** BEGIN Excerpt from 3GPP TR 38.802, v.14.2.0 ***

"NR supports paired and unpaired spectrum and strives to maximize commonality between the technical solutions, allowing FDD operation on a paired spectrum, different transmission directions in either part of a paired spectrum, TDD operation on an unpaired spectrum where the transmission direction of time resources is not dynamically changed, and TDD operation on an unpaired spectrum where the transmission direction of most time resources can be dynamically changing.  DL and UL transmission directions at least for data can be dynamically assigned on a per-slot basis at least in a Time Division Multiplexing (TDM) manner.  It is noted that transmission directions include all of downlink, uplink, sidelink, and backhaul link.  NR supports at least semi-statically assigned DL/UL transmission direction as New Radio Base Station (gNB) operation, i.e., the assigned DL/UL transmission direction can be signaled to User Equipment (UE) by higher layer signaling."

END Excerpt from 3GPP TR 38.802, v.14.2.0

This flexible design in NR allows Orthogonal Frequency-Division Multiplexing (OFDM) symbols in a slot to be classified as 'downlink,' 'flexible,' or 'uplink.' This effectively means that downlink transmissions can only occur in symbols classified as 'downlink' or 'flexible,' while uplink transmission can only occur in symbols classified as 'uplink' or 'flexible.' As an example, table 11.1.1-1 from section 11.1.1 of 3GPP Technical Specification (TS) 38.213, v. 16.3.0, Physical layer procedures for control, Rel. 16 (09-2020) is reproduced below to show the defined slot formats that can be used, in combination with Radio Resource Control (RRC) signaling, to inform the transmission direction in OFDM symbols, valid for one or more slots.

BEGIN Excerpt from 3GPP TS 38.213, v. 16.3.0

TABLE 11.1.1-1

Slot formats for normal cyclic prefix (D—downlink, U—uplink, F—flexible)

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | F | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on TDD-UL-DL-ConfigurationCommon, or TDD-UL-DL-ConfigDedicated and, if any, on detected DCI formats | | | | | | | | | | | | | |

END Excerpt from 3GPP TS 38.213, v. 16.3.0

With the flexible slot format as shown above, the scheduler may dynamically determine the transmission direction, called dynamic TDD. Despite the "dynamic TDD" name, dynamic TDD can actually be applicable to half-duplex FDD as well (or even full-duplex operation, although in this case there may be limited need to coordinate uplink and downlink scheduling decisions). This provides NR with a flexible framework that can cope with rapid traffic variations (e.g., during periods of high DL data transmission). For example, most of the slots could be defined as downlink to accommodate those transmissions.

In this context, TDD configurations between neighboring cells can be misaligned, resulting in what is called Cross-Link Interference (CLI). In other words, CLI exists in the case that neighboring cells use different transmission directions on the same or partially-overlapping time-frequency resources.

FIG. 1 is a block schematic diagram illustrating interference due to different TDD configurations in Cell A and Cell B. CLI may occur in at least two cases. In a first case 102 (DL degradation to a UE using same resource allocated in the UL of a neighboring Transmission/Reception Point (TRP)), a UE-1 connected to a TRP-A (e.g., Cell A) and is using a resource-X for its UL transmissions, while another TRP-B (e.g., Cell B) is using that same resource for the downlink (DL) of a UE-2 connected to it. Then, UE-2 connected to TRP-B will suffer interference in its DL caused by the UL transmissions of UE-1 to TRP-A, i.e., causing DL degradation to UE-2 and increasing the chances of a failures due to an increased Signal-to-Interference-plus-Noise-Ratio (SINR) due to CLI. In a second case 104, there is an UL degradation to a UE, i.e., the problem is in the UL of the UE-1, which receives interference from UE-2 (whose DL transmissions are on the same resources).

Since the transmission power of TRP for DL transmissions is larger than the power of UEs for UL transmissions, the interference caused by the DL's TRP-B in the UE's UL transmissions to TRP-A (first case of UL degradation) may be considered more critical than the case where the DL of UE-2 connected to TRP-B is interfered by the UL of UE-1.

FIG. 2 is a schematic diagram of the CLI interference scenario of FIG. 1, considering a scheduling on the same or partially-overlapping time-frequency resources. In the illustrated embodiment, UE-1 is scheduled for UL in Cell A and UE-2 is scheduled for DL in Cell B. The DL from Cell B may be a source of interference for the UL reception scheduled in Cell A, called TRP-to-TRP CLI (or DL-to-UL interference). Moreover, the UL of UE-1 can cause significant degradation in DL reception for UE-2, called UE-to-UE CLI (or UL-to-DL interference).

To mitigate this, techniques were investigated in 3GPP TR 38.802 for both TRP-to-TRP and UE-to-UE CLI (See 3GPP TR 38.802, v. 14.2.0, "Study on new radio access technology Physical layer aspects", Rel. 14 (09-2017). Some of those techniques are based on CLI measurements to be performed in the UE to assist the network to identify the problem. The current RRC specifications define a measurement configuration framework where the UE is configured (e.g., measConfig of Information Element (IE) MeasConfig included in an RRCReconfiguration message) to perform CLI measurements and report them back to the network in an MeasurementReport message.

CLI measurements can be configured for NR cells in all Multi-Radio Dual Connectivity (MR-DC) options. In Evolved Universal Terrestrial Radio Access (E-UTRA)-NR Dual Connectivity (EN-DC) and Next Generation Radio Access Node (NG-RAN)-E-UTRA Dual Connectivity (NGEN-DC), only the Second Node (SN) can configure CLI measurements. In NR-E-UTRA Dual Connectivity (NE-DC), only the Master Node (MN) can configure CLI measurements. In NR Dual Connectivity (NR-DC), both the MN and the SN can configure CLI measurements, and the MN informs the SN about the maximum number of CLI measurement resources that can be configured by the SN to ensure that the total number of CLI measurement resources does not exceed the UE capabilities.

The network may configure the UE to report the following measurement information based on Sounding Reference Signal (SRS) resources:

Measurement results per SRS resource;

SRS resource(s) indexes.

The network may configure the UE to report the following measurement information based on CLI-Received Signal Strength Indicator (RSSI) resources:

Measurement results per CLI-RSSI resource;

CLI-RSSI resource(s) indexes.

For CLI measurements, the network can configure SRS Reference Signal Received Power (SRS-RSRP) or CLI-RSSI as trigger quantity. For CLI measurements, reporting quantities can be only SRS-RSRP or only CLI-RSSI.

Related procedures and ASN.1 aspects for CLI so far are defined in 3GPP TS 38.331. As an example, portions of sections 5.5.3-5.5.5 and 6.3.2 of 3GPP TS 38.331, v. 16.0.0, RRC protocol specification, Rel. 16 (03-2020) are reproduced below:

*** BEGIN Excerpt from 3GPP TS 38.331, v. 16.0.0 ***

5.5.3       Performing measurements

5.5.3.1          General

[...]

The UE shall:

> [...]
>
>> 2> if the *reportType* for the associated *reportConfig* is *cli-Periodical* or *cli-EventTriggered*:
>>
>>> 3> perform the corresponding measurements associated to CLI measurement resources indicated in the concerned *measObjectCLI*;
>>
>> 2> perform the evaluation of reporting criteria as specified in 5.5.4....

[...]

5.5.4          Measurement report triggering

5.5.4.1          General

If AS security has been activated successfully, the UE shall:

> 1> for each *measId* included in the *measIdList* within *VarMeasConfig*:
>
>> 2> if the corresponding *reportConfig* includes a *reportType* set to *eventTriggered* or *periodical*:
>>
>>> [...]
>>
>> 2> else if the corresponding *reportConfig* includes a *reportType* set to *reportCGI*:
>>
>>> [...]
>>
>> 2> else if the corresponding *reportConfig* includes a *reportType* set to *reportSFTD*:
>>
>>> [...]
>>
>> 2> else if the corresponding *reportConfig* includes a *reportType* set to *cli-Periodical* or *cli-EventTriggered*:
>>
>>> 3> consider all CLI measurement resources included in the corresponding *measObject* to be applicable;
>>>
>>> [...]
>>
>> 2> if the *reportType* is set to *cli-EventTriggered* and if the entry condition applicable for this event, i.e., the event corresponding with the *eventId* of the corresponding *reportConfig* within *VarMeasConfig*, is fulfilled for one or more applicable CLI measurement resources for all measurements after layer 3 filtering taken during *timeToTrigger* defined for this event within the *VarMeasConfig*, while the *VarMeasReportList* does not include a measurement reporting entry for this *measId* (a first CLI measurement resource triggers the event):

3> include a measurement reporting entry within the *VarMeasReportList* for this *measId*;

3> set the *numberOfReportsSent* defined within the *VarMeasReportList* for this *measId* to 0;

3> include the concerned CLI measurement resource(s) in the *cli-TriggeredList* defined within the *VarMeasReportList* for this *measId*;

3> initiate the measurement reporting procedure, as specified in 5.5.5;

2> else if the *reportType* is set to *cli-EventTriggered* and if the entry condition applicable for this event, i.e., the event corresponding with the *eventId* of the corresponding *reportConfig* within *VarMeasConfig*, is fulfilled for one or more CLI measurement resources not included in the *cli-TriggeredList* for all measurements after layer 3 filtering taken during *timeToTrigger* defined for this event within the *VarMeasConfig* (a subsequent CLI measurement resource triggers the event):

3> set the *numberOfReportsSent* defined within the *VarMeasReportList* for this *measId* to 0;

3> include the concerned CLI measurement resource(s) in the *cli-TriggeredList* defined within the *VarMeasReportList* for this *measId*;

3> initiate the measurement reporting procedure, as specified in 5.5.5;

2> else if the *reportType* is set to *cli-EventTriggered* and if the leaving condition applicable for this event is fulfilled for one or more of the CLI measurement resources included in the *cli-TriggeredList* defined within the *VarMeasReportList* for this *measId* for all measurements after layer 3 filtering taken during *timeToTrigger* defined within the *VarMeasConfig* for this event:

3> remove the concerned CLI measurement resource(s) in the *cli-TriggeredList* defined within the *VarMeasReportList* for this *measId*;

3> if *reportOnLeave* is set to *true* for the corresponding reporting configuration:

4> initiate the measurement reporting procedure, as specified in 5.5.5;

3> if the *cli-TriggeredList* defined within the *VarMeasReportList* for this *measId* is empty:

4> remove the measurement reporting entry within the *VarMeasReportList* for this *measId*;

4> stop the periodical reporting timer for this *measId*, if running;

2> if *reportType* is set to cli-Periodical and if a (first) measurement result is available:

3> include a measurement reporting entry within the *VarMeasReportList* for this *measId*;

3> set the *numberOfReportsSent* defined within the *VarMeasReportList* for this *measId* to 0;

3> initiate the measurement reporting procedure, as specified in 5.5.5, immediately after the quantity to be reported becomes available for at least one CLI measurement resource;

2> upon expiry of the periodical reporting timer for this *measId*:

3> initiate the measurement reporting procedure, as specified in 5.5.5.

[...]

5.5.4.10    Event I1 (Interference becomes higher than threshold)

The UE shall:

1> consider the entering condition for this event to be satisfied when condition I1-1, as specified below, is fulfilled;

1> consider the leaving condition for this event to be satisfied when condition I1-2, as specified below, is fulfilled.

Inequality I1-1 (Entering condition)

$Mi - Hys > Thresh$

Inequality I1-2 (Leaving condition)

$Mi + Hys < Thresh$

The variables in the formula are defined as follows:

Mi is the measurement result of the interference, not taking into account any offsets.

Hys is the hysteresis parameter for this event (i.e., *hysteresis* as defined within *reportConfigNR* for this event).

Thresh is the threshold parameter for this event (i.e., *i1-Threshold* as defined within *reportConfigNR* for this event).

Mi, Thresh are expressed in dBm.

Hys is expressed in dB.

[...]

5.5.5  Measurement reporting

5.5.5.1    General

[...]

The purpose of this procedure is to transfer measurement results from the UE to the network. The UE shall initiate this procedure only after successful AS security activation.

For the *measId* for which the measurement reporting procedure was triggered, the UE shall set the *measResults* within the *MeasurementReport* message as follows:

1> set the *measId* to the measurement identity that triggered the measurement reporting;

[...]

1> if there is at least one applicable CLI measurement resource to report:

2> if the *reportType* is set to *cli-EventTriggered* or *cli-Periodical*:

3> set the *measResultCLI* to include the most interfering SRS resources or most interfering CLI-RSSI resources up to *maxReportCLI* in accordance with the following:

4> if the *reportType* is set to *cli-EventTriggered*:

5> if trigger quantity is set to *srs-RSRP* i.e. *i1-Threshold* is set to *srs-RSRP*:

6> include the SRS resource included in the *cli-TriggeredList* as defined within the *VarMeasReportList* for this *measId*;

5> if trigger quantity is set to *cli-RSSI* i.e. *i1-Threshold* is set to *cli-RSSI*:

6> include the CLI-RSSI resource included in the *cli-TriggeredList* as defined within the *VarMeasReportList* for this *measId*;

4> else:

5> if *reportQuantityCLI* is set to *srs-rsrp*:

6> include the applicable SRS resources for which the new measurement results became available since the last periodical reporting or since the measurement was initiated or reset;

5> else:

6> include the applicable CLI-RSSI resources for which the new measurement results became available since the last periodical reporting or since the measurement was initiated or reset;

4> for each SRS resource that is included in the *measResultCLI*:

5> include the *srs-ResourceId*;

5> set *srs-RSRP-Result* to include the layer 3 filtered measured results in decreasing order, i.e. the most interfering SRS resource is included first;

4> for each CLI-RSSI resource that is included in the *measResultCLI*:

5> include the *rssi-ResourceId*;

5> set *cli-RSSI-Result* to include the layer 3 filtered measured results in decreasing order, i.e. the most interfering CLI-RSSI resource is included first;

1> increment the *numberOfReportsSent* as defined within the *VarMeasReportList* for this *measId* by 1;

1> stop the periodical reporting timer, if running;

1> if the *numberOfReportsSent* as defined within the *VarMeasReportList* for this *measId* is less than the *reportAmount* as defined within the corresponding *reportConfig* for this *measId*:

>> 2> start the periodical reporting timer with the value of *reportInterval* as defined within the corresponding *reportConfig* for this *measId*;

1> else:

>> 2> if the *reportType* is set to *periodical* or *cli-Periodical*:

>>> 3> remove the entry within the *VarMeasReportList* for this *measId*;

>>> 3> remove this *measId* from the *measIdList* within *VarMeasConfig*;

1> if the UE is in (NG)EN-DC:

>> 2> if SRB3 is configured:

>>> 3> submit the *MeasurementReport* message via SRB3 to lower layers for transmission, upon which the procedure ends;

>> 2> else:

>>> 3> submit the *MeasurementReport* message via the E-UTRA MCG embedded in E-UTRA RRC message *ULInformationTransferMRDC* as specified in TS 36.331 [10].

1> else if the UE is in NR-DC:

>> 2> if the measurement configuration that triggered this measurement report is associated with the SCG:

>>> 3> if SRB3 is configured:

>>>> 4> submit the *MeasurementReport* message via SRB3 to lower layers for transmission, upon which the procedure ends;

>>> 3> else:

>>>> 4> submit the *MeasurementReport* message via the NR MCG embedded in NR RRC message *ULInformationTransferMRDC* as specified in 5.7.2a.3;

>> 2> else:

>>> 3> submit the *MeasurementReport* message via SRB1 to lower layers for transmission, upon which the procedure ends;

1> else:

>> 2> submit the *MeasurementReport* message to lower layers for transmission, upon which the procedure ends.

[...]

6.3.2    Radio resource control information elements

— *CLI-RSSI-Range*

The IE *CLI-RSSI-Range* specifies the value range used in CLI-RSSI measurements and thresholds. The integer value for CLI-RSSI measurements is according to Table [FFS] in TS 38.133 [14].

CLI-RSSI-Range information element

```
-- ASN1START
-- TAG-CLI-RSSI-RANGE-START

CLI-RSSI-Range-r16 ::=                          INTEGER(0..76)

-- TAG-CLI-RSSI-RANGE-STOP
-- ASN1STOP
```

— *MeasObjectCLI*

The IE MeasObjectCLI specifies information applicable for SRS-RSRP measurements and/or CLI-RSSI measurements.

MeasObjectCLI information element

```
-- ASN1START
-- TAG-MEASOBJECTCLI-START

MeasObjectCLI-r16 ::=               SEQUENCE {
     cli-ResourceConfig-r16             ,
     ...
}

CLI-ResourceConfig-r16 ::=          SEQUENCE {
   srs-ResourceConfig-r16 SetupRelease { SRS-
ResourceListConfigCLI-r16 }
OPTIONAL, -- Need M
 rssi-ResourceConfig-r16 SetupRelease { RSSI-
ResourceListConfigCLI-r16 }
OPTIONAL -- Need M
}

SRS-ResourceListConfigCLI-r16 ::=   SEQUENCE (SIZE (1..
maxNrofSRS-Resources-r16)) OF SRS-ResourceConfigCLI-r16

RSSI-ResourceListConfigCLI-r16 ::=  SEQUENCE (SIZE (1..
maxNrofCLI-RSSI-Resources-r16)) OF RSSI-ResourceConfigCLI-r16

SRS-ResourceConfigCLI-r16 ::       SEQUENCE {
     srs-Resource-r16                  SRS-Resource,
     srs-SCS-r16                       SubcarrierSpacing,
...
}

RSSI-ResourceConfigCLI-r16 ::      SEQUENCE {
     rssi-ResourceId-r16               ,
```

```
    rssi-SCS-r16                          SubcarrierSpacing,
    startPRB-r16                          INTEGER (0..2169),
    nrofPRBs-r16                          INTEGER
(4..maxNrofPhysicalResourceBlocksPlus1),
    startPosition-r16                     INTEGER (0..13),
    nrofSymbols-r16                       INTEGER (1..14),
    rssi-PeriodicityAndOffset-r16       ,
    ...
}

RSSI-ResourceId-r16 ::=               INTEGER (0.. maxNrofCLI-RSSI-
Resources-r16-1)

RSSI-PeriodicityAndOffset-r16 ::=   CHOICE {
    sl10                                INTEGER(0..9),
    sl20                                INTEGER(0..19),
    sl40                                INTEGER(0..39),
    sl80                                INTEGER(0..79),
    sl160                               INTEGER(0..159),
    sl320                               INTEGER(0..319),
    sl640                               INTEGER(0..639),
    ...
}

-- TAG-MEASOBJECTCLI-STOP
-- ASN1STOP
```

| *CLI-ResourceConfig* field descriptions |
|---|
| srs-ResourceConfig <br> SRS resources to be used for CLI measurements. |
| rssi-ResourceConfig <br> CLI-RSSI resources to be used for CLI measurements. |

| *MeasObjectCLI* field descriptions |
|---|
| cli-ResourceConfig <br> SRS and/or CLI-RSSI resource configuration for CLI measurement. |

| *SRS-ResourceConfigCLI* field descriptions |
|---|
| srs-SCS-r16 <br> Subcarrier spacing for SRS.  Only the values 15, 30 kHz or 60 kHz (FR1), and 60 or 120 kHz (FR2) are applicable. |

| *RSSI-ResourceConfigCLI* field descriptions |
|---|
| nrofPRBs <br> Allowed size of the measurement BW.  Only multiples of 4 are allowed.  The smallest configurable number is the minimum of 4 and the width of the active DL BWP.  If the configured value is larger than the width of the active DL BWP, the UE shall assume that the actual CLI-RSSI resource bandwidth is within the active DL BWP. |

| *nrofSymbols* |
| :--- |
| Within a slot that is configured for CLI-RSSI measurement (see *slotConfiguration*), the UE measures the RSSI from *startPosition* to *startPosition* + *nrofSymbols* - 1. The configured CLI-RSSI resource does not exceed the slot boundary of the reference SCS. If the SCS of configured active DL BWP(s) is larger than the reference SCS, network configures *startPosition* and *nrofSymbols* such that the configured CLI-RSSI resource not to exceed the slot boundary corresponding to the active BWP SCS. If the reference SCS is larger than SCS of active DL BWP(s), network ensures *startPosition* and *nrofSymbols* are integer multiple of reference SCS divided by active BWP SCS. |
| *rssi-PeriodicityAndOffset-r16* |
| Periodicity and slot offset for this CLI-RSSI resource. All values are in "number of slots". Value *sl1* corresponds to a periodicity of 1 slot, value *sl2* corresponds to a periodicity of 2 slots, and so on. For each periodicity the corresponding offset is given in number of slots. |
| *rssi-scs-r16* |
| Reference subcarrier spacing for CLI-RSSI measurement. Only the values 15, 30 kHz or 60 kHz (FR1), and 60 or 120 kHz (FR2) are applicable. |
| *startPosition* |
| OFDM symbol location of the CLI-RSSI resource within a slot. |
| *startPRB* |
| Starting PRB index of the measurement bandwidth. For the case where the reference subcarrier spacing is smaller than subcarrier spacing of active DL BWP(s), network configures *startPRB* and *nrofPRBs* are as a multiple of active BW SCS divided by reference SCS. |

[...]

*–    MeasObjectToAddModList*

The IE MeasObjectToAddModList concerns a list of measurement objects to add or modify.

*MeasObjectToAddModList* information element

```
-- ASN1START
-- TAG-MEASOBJECTTOADDMODLIST-START

MeasObjectToAddModList ::=      SEQUENCE (SIZE
(1..maxNrofObjectId)) OF MeasObjectToAddMod MeasObjectToAddMod ::=          SEQUENCE {
    measObjectId                    ,
    measObject                      CHOICE {
        measObjectNR                    ,
        ...,
        measObjectEUTRA                 ,
        measObjectCLI-r16
    }
}
```

```
-- TAG-MEASOBJECTTOADDMODLIST-STOP
-- ASN1STOP
```

[...]

− *MeasResults*

The IE MeasResults covers measured results for intra-frequency, inter-frequency, and inter-RAT mobility.

*MeasResults* information element

```
-- ASN1START
-- TAG-MEASRESULTS-START

MeasResults ::=                       SEQUENCE {
    measId                                ,
    measResultServingMOList               MeasResultServMOList,
    measResultNeighCells                  CHOICE {
        measResultListNR                      ,
        ...,
        measResultListEUTRA
    }
OPTIONAL,
    ...,
    [[
    measResultServFreqListEUTRA-SCG
OPTIONAL,
    measResultServFreqListNR-SCG
OPTIONAL,
    measResultSFTD-EUTRA              OPTIONAL,
    measResultSFTD-NR                 MeasResultCellSFTD-NR
OPTIONAL
    ]],
    [[
    measResultCellListSFTD-NR     OPTIONAL
    ]],
    [[
    measResultCLI-r16                     OPTIONAL
    ]]
}

MeasResultServMOList ::=           SEQUENCE (SIZE
(1..maxNrofServingCells)) OF MeasResultServMO MeasResultServMO ::=               SEQUENCE {
    servCellId                        ServCellIndex,
    measResultServingCell             MeasResultNR,
    measResultBestNeighCell           MeasResultNR
OPTIONAL,
    ...
```

```
}

MeasResultListNR ::=                SEQUENCE (SIZE
(1..maxCellReport)) OF MeasResultNR MeasResultNR ::=                    SEQUENCE {
    physCellId                          PhysCellId
OPTIONAL,
    measResult                          SEQUENCE {
        cellResults                         SEQUENCE{
            resultsSSB-Cell         MeasQuantityResults
OPTIONAL,
            resultsCSI-RS-Cell      MeasQuantityResults
OPTIONAL
        },
        rsIndexResults                      SEQUENCE{
            resultsSSB-Indexes    ResultsPerSSB-IndexList
OPTIONAL,
            resultsCSI-RS-Indexes       ResultsPerCSI-RS-
IndexList
OPTIONAL
        }
OPTIONAL
    },
    ...,
    [[
    cgi-Info                            CGI-InfoNR
OPTIONAL
    ]]
}

MeasResultListEUTRA ::=             SEQUENCE (SIZE
(1..maxCellReport)) OF MeasResultEUTRA MeasResultEUTRA ::=                 SEQUENCE {
    eutra-PhysCellId                    PhysCellId,
    measResult                          MeasQuantityResultsEUTRA, cgi-Info                            CGI-InfoEUTRA
OPTIONAL,
    ...
}

MultiBandInfoListEUTRA ::=          SEQUENCE (SIZE
(1..maxMultiBands)) OF FreqBandIndicatorEUTRA MeasQuantityResults ::=             SEQUENCE {
    rsrp                                RSRP-Range
OPTIONAL,
    rsrq                                RSRQ-Range
OPTIONAL,
```

```
        sinr                          SINR-Range
OPTIONAL
}

MeasQuantityResultsEUTRA ::=        SEQUENCE {
    rsrp                            RSRP-RangeEUTRA
OPTIONAL,
    rsrq                            RSRQ-RangeEUTRA
OPTIONAL,
    sinr                            SINR-RangeEUTRA
OPTIONAL
}

ResultsPerSSB-IndexList::= SEQUENCE (SIZE
(1..maxNrofIndexesToReport2)) OF ResultsPerSSB-Index ResultsPerSSB-Index ::=            SEQUENCE {
    ssb-Index                       SSB-Index,
    ssb-Results                     MeasQuantityResults
OPTIONAL
}

ResultsPerCSI-RS-IndexList::= SEQUENCE (SIZE
(1..maxNrofIndexesToReport2)) OF ResultsPerCSI-RS-Index ResultsPerCSI-RS-Index ::=         SEQUENCE {
    csi-RS-Index                    CSI-RS-Index,
    csi-RS-Results                  MeasQuantityResults
OPTIONAL
}
MeasResultServFreqListEUTRA-SCG ::= SEQUENCE (SIZE
(1..maxNrofServingCellsEUTRA)) OF MeasResult2EUTRA MeasResultServFreqListNR-SCG ::= SEQUENCE (SIZE
(1..maxNrofServingCells)) OF MeasResult2NR MeasResultCLI-r16 ::=              SEQUENCE {
    measResultListSRS-RSRP-r16 MeasResultListSRS-RSRP-r16
OPTIONAL,
    measResultListCLI-RSSI-r16 MeasResultListCLI-RSSI-r16
OPTIONAL
}

MeasResultListSRS-RSRP-r16:= SEQUENCE (SIZE (1.. maxCLI-Report-
r16)) OF MeasResultSRS-RSRP-r16

MeasResultSRS-RSRP-r16 ::=         SEQUENCE {
    srs-ResourceId-r16              SRS-ResourceId,
    srs-RSRP-Result-r16            SRS-RSRP-Range-r16
}
```

```
MeasResultListCLI-RSSI-r16:=        SEQUENCE (SIZE (1.. maxCLI-
Report-r16)) OF MeasResultCLI-RSSI-r16

MeasResultCLI-RSSI-r16 ::=          SEQUENCE {
    rssi-ResourceId-r16                 RSSI-ResourceId-r16,
    cli-RSSI-Result-r16                 CLI-RSSI-Range-r16
}

-- TAG-MEASRESULTS-STOP
-- ASN1STOP
```

| measResultCLI |
| CLI measurement results. |

[...]

–        *ReportConfigNR*

The IE ReportConfigNR specifies criteria for triggering of an NR measurement reporting event. For events labelled AN with N equal to 1, 2 and so on, measurement reporting events are based on cell measurement results, which can either be derived based on SS/PBCH block or CSI-RS.

Event A1:   Serving becomes better than absolute threshold;

Event A2:   Serving becomes worse than absolute threshold;

Event A3:   Neighbour becomes amount of offset better than PCell/PSCell;

Event A4:   Neighbour becomes better than absolute threshold;

Event A5:   PCell/PSCell becomes worse than absolute threshold1 AND Neighbour/SCell becomes better than another absolute threshold2;

Event A6:   Neighbour becomes amount of offset better than SCell.

For event I1, measurement reporting event is based on CLI measurement results, which can either be derived based on SRS-RSRP or CLI-RSSI.

Event I1:   Interference becomes higher than absolute threshold.

*ReportConfigNR* information element

```
-- ASN1START
-- TAG-REPORTCONFIGNR-START

ReportConfigNR ::=                  SEQUENCE {
    reportType                          CHOICE {
        periodical                          PeriodicalReportConfig,
        eventTriggered                      EventTriggerConfig,
        ...,
        reportCGI                           ReportCGI,
        reportSFTD                          ReportSFTD-NR,
```

```
        cli-Periodical-r16                    CLI-
PeriodicalReportConfig-r16,
        cli-EventTriggered-r16                CLI-EventTriggerConfig-
r16
    }
}

ReportCGI ::=                       SEQUENCE {
    cellForWhichToReportCGI           PhysCellId,
        ...
}

ReportSFTD-NR ::=                   SEQUENCE {
    reportSFTD-Meas                   BOOLEAN,
    reportRSRP                        BOOLEAN,
    ...,
    [[
    reportSFTD-NeighMeas              ENUMERATED {true}
OPTIONAL,     -- Need R
    drx-SFTD-NeighMeas               ENUMERATED {true}
OPTIONAL,     -- Need R
    cellsForWhichToReportSFTD SEQUENCE (SIZE (1..maxCellSFTD)) OF
PhysCellId OPTIONAL -- Need R
    ]]
}

EventTriggerConfig::=               SEQUENCE {
    eventId                            CHOICE {
        eventA1                           SEQUENCE {
            a1-Threshold                      MeasTriggerQuantity,
            reportOnLeave                     BOOLEAN,
            hysteresis                        Hysteresis,
            timeToTrigger                     TimeToTrigger
        },
        eventA2                           SEQUENCE {
            a2-Threshold                      MeasTriggerQuantity,
            reportOnLeave                     BOOLEAN,
            hysteresis                        Hysteresis,
            timeToTrigger                     TimeToTrigger
        },
        eventA3                           SEQUENCE {
            a3-Offset
MeasTriggerQuantityOffset,
            reportOnLeave                     BOOLEAN,
            hysteresis                        Hysteresis,
            timeToTrigger                     TimeToTrigger,
            useWhiteCellList                  BOOLEAN
        },
        eventA4                           SEQUENCE {
            a4-Threshold                      MeasTriggerQuantity,
            reportOnLeave                     BOOLEAN,
            hysteresis                        Hysteresis,
```

```
        timeToTrigger                    TimeToTrigger,
        useWhiteCellList                 BOOLEAN
    },
    eventA5                              SEQUENCE {
        a5-Threshold1                        MeasTriggerQuantity,
        a5-Threshold2                        MeasTriggerQuantity,
        reportOnLeave                        BOOLEAN,
        hysteresis                           Hysteresis,
        timeToTrigger                        TimeToTrigger,
        useWhiteCellList                     BOOLEAN
    },
    eventA6                              SEQUENCE {
        a6-Offset
MeasTriggerQuantityOffset,
        reportOnLeave                        BOOLEAN,
        hysteresis                           Hysteresis,
        timeToTrigger                        TimeToTrigger,
        useWhiteCellList                     BOOLEAN
    },
    ...
}, rsType                           NR-RS-Type, reportInterval                   ReportInterval,
    reportAmount                     ENUMERATED {r1, r2, r4, r8,
r16, r32, r64, infinity}, reportQuantityCell               MeasReportQuantity,
    maxReportCells                   INTEGER (1..maxCellReport), reportQuantityRS-Indexes         MeasReportQuantity
OPTIONAL,    -- Need R
    maxNrofRS-IndexesToReport        INTEGER
(1..maxNrofIndexesToReport) OPTIONAL,    -- Need R
    includeBeamMeasurements          BOOLEAN,
    reportAddNeighMeas               ENUMERATED {setup}
OPTIONAL,    -- Need R
    ...
}

PeriodicalReportConfig ::=       SEQUENCE {
    rsType                           NR-RS-Type, reportInterval                   ReportInterval,
    reportAmount                     ENUMERATED {r1, r2, r4, r8,
r16, r32, r64, infinity}, reportQuantityCell               MeasReportQuantity,
    maxReportCells                   INTEGER (1..maxCellReport),
```

```
    reportQuantityRS-Indexes          MeasReportQuantity
OPTIONAL,    -- Need R
    maxNrofRS-IndexesToReport          INTEGER
(1..maxNrofIndexesToReport) OPTIONAL,    -- Need R
    includeBeamMeasurements           BOOLEAN,
    useWhiteCellList                  BOOLEAN,
    ...
}

NR-RS-Type ::=                        ENUMERATED {ssb, csi-rs}

MeasTriggerQuantity ::=               CHOICE {
    rsrp                                  RSRP-Range,
    rsrq                                  RSRQ-Range,
    sinr                                  SINR-Range
}

MeasTriggerQuantityOffset ::=     CHOICE {
    rsrp                                  INTEGER (-30..30),
    rsrq                                  INTEGER (-30..30),
    sinr                                  INTEGER (-30..30)
}

MeasReportQuantity ::=                SEQUENCE {
    rsrp                                  BOOLEAN,
    rsrq                                  BOOLEAN,
    sinr                                  BOOLEAN
}

CLI-EventTriggerConfig-r16        SEQUENCE {
    eventId-r16                           CHOICE {
        eventI1-r16                           SEQUENCE {
            i1-Threshold-r16
MeasTriggerQuantityCLI-r16,
            reportOnLeave-r16                     BOOLEAN,
            hysteresis-r16                        Hysteresis,
            timeToTrigger-r16                     TimeToTrigger
        },
           ...
    },
    reportInterval-r16                ReportInterval,
    reportAmount-r16                  ENUMERATED {r1, r2, r4, r8,
r16, r32, r64, infinity},
    maxReportCLI-r16                      INTEGER (1..maxCLI-Report-
r16),
    ...
}

CLI-PeriodicalReportConfig-r16 ::= SEQUENCE {
    reportInterval-r16                    ReportInterval,
```

```
    reportAmount-r16                  ENUMERATED {r1, r2, r4, r8,
r16, r32, r64, infinity},
    reportQuantityCLI-r16            MeasReportQuantityCLI-r16,
    maxReportCLI-r16                 INTEGER (1..maxCLI-Report-
r16),
    ...
}

MeasTriggerQuantityCLI-r16 ::=   CHOICE {
    srs-RSRP-r16                     SRS-RSRP-Range-r16,
    cli-RSSI-r16                     CLI-RSSI-Range-r16
}

MeasReportQuantityCLI-r16 ::=       ENUMERATED {srs-rsrp, cli-
rssi}

-- TAG-REPORTCONFIGNR-STOP
-- ASN1STOP
****************************************************************

***
```

**\*\*\*\*\* END Excerpt from 3GPP TS 38.331, v. 16.0.0 \*\*\*\*\***

Handover Failure

For intra-NR RAN handover, the source gNB triggers the Uu handover by sending an RRCReconfiguration message to the UE, containing the information required to access the target cell (including Cel #GroupConfig→spCellConfig→reconfigurationWithSync). The UE thus synchronizes to the target cell and completes the RRC handover procedure by sending RRCReconfigurationComplete message to the target gNB.

However, there may be a failure in this handover process, in which case the UE will not be able to successfully complete random access on the target cell. Therefore, by the time the RRCReconfiguration message including reconfigurationWithSync is received, a timer is started (T304) and will continue to run until the UE successfully completes random access on the target cell.

If this timer expires, the UE will initiate RRC procedures for Reconfiguration with sync Failure. Those procedures will store a variable with handover failure information which can be later requested by the network via UE information procedure. As an example, portions of section 5.3.5.8.3 of 3GPP TS 38.331, v. 16.0.0, RRC protocol specification, Rel. 16 (03-2020), and portions of section 5.7.x1 of 3GPP TS 38.331 Change Request (CR) 1488 rev 2, CR for introducing Minimization of Drive Test (MDT) and Self-Organizing Networks (SON), Rel. 16 (03-2020) are reproduced below:

*** BEGIN Excerpt from 3GPP TS 38.331, v. 16.0.0 ***

5.3.5.8.3 T304 expiry (Reconfiguration with sync Failure)

The UE shall:

1> if T304 of the MCG expires:

2> release dedicated preambles provided in *rach-ConfigDedicated* if configured;

2> revert back to the UE configuration used in the source PCell;

2> store the following handover failure information in *VarRLF-Report* by setting its fields as follows:

3> clear the information included in *VarRLF-Report*, if any;

3> set the *plmn-IdentityList* to include the list of EPLMNs stored by the UE (i.e. includes the RPLMN);

3> set the *measResultLastServCell* to include the RSRP, RSRQ and the available SINR, of the source PCell based on the available SSB and CSI-RS measurements collected up to the moment the UE detected handover failure;

3> set the *ssbRLMConfigBitmap* and/or *csi-rsRLMConfigBitmap* in *measResultLastServCell* to include the radio link monitoring configuration of the source PCell;

3> for each of the configured *measObjectNR* in which measurements are available;

4> if the SS/PBCH block-based measurement quantities are available;

5> set the *measResultListNR* in *measResultNeighCells* to include all the available measurement quantities of the best measured cells associated to the *measObjectNR*, other than the source PCell, ordered such that the cell with highest SS/PBCH block RSRP is listed first if SS/PBCH block RSRP measurement results are available, otherwise the cell with highest SS/PBCH block RSRQ is listed first if SS/PBCH block RSRQ measurement results are available, otherwise the cell with highest SS/PBCH block SINR is listed first, based on the available SS/PBCH block based measurements collected up to the moment the UE detected handover failure;

6> for each neighbour cell included, include the optional fields that are available;

4> if the CSI-RS based measurement quantities are available;

5> set the *measResultListNR* in *measResultNeighCells* to include all the available measurement quantities of the best measured cells, other than the source PCell, ordered such that the cell with highest CSI- RS RSRP is listed first if CSI-RS RSRP measurement results are available, otherwise the cell with highest CSI-RS RSRQ is listed first if CSI-RS RSRQ measurement results are available, otherwise the cell with highest CSI-RS SINR is listed first, based on the available CSI-RS based measurements collected up to the moment the UE detected handover failure;

6> for each neighbour cell included, include the optional fields that are available;

3> for each of the configured EUTRA frequencies in which measurements are available;

4> set the *measResultListEUTRA* in *measResultNeighCells* to include the best measured cells ordered such that the cell with highest RSRP is listed first if RSRP measurement results are available, otherwise the cell with highest RSRQ is listed first, and based on measurements collected up to the moment the UE detected radio link failure;

5> for each neighbour cell included, include the optional fields that are available;

NOTE 0:    The measured quantities are filtered by the L3 filter as configured in the mobility measurement configuration. The measurements are based on the time domain measurement resource restriction, if configured. Blacklisted cells are not required to be reported.

3> if detailed location information is available, set the content of the *LocationInfo* as follows:

4> if available, set the *commonLocationInfo* to include the detailed location information;

4> if available, set the *bt-LocationInfo* to include the Bluetooth measurement results, in order of decreasing RSSI for Bluetooth beacons;

4> if available, set the *wlan-LocationInfo* to include the WLAN measurement results, in order of decreasing RSSI for WLAN APs;

4> if available, set the *sensor-LocationInfo* to include the sensor measurement results;

3> set the *failedPCellId* to the global cell identity and tracking area code, if available, and otherwise to the physical cell identity and carrier frequency of the target PCell of the failed handover;

3> include *previousPCellId* and set it to the global cell identity and tracking area code of the PCell where the last *RRCReconfiguration* message including *reconfigurationWithSync* was received;

3> set the *timeConnFailure* to the elapsed time since reception of the last *RRCReconfiguration* message including the *reconfigurationWithSync*;

3> set the *connectionFailureType* to *hof*;

3> set the *c-RNTI* to the C-RNTI used in the source PCell;

3> set the *absoluteFrequencyPointA* to indicate the absolute frequency of the reference resource block associated to the random-access resources;

3> set the *locationAndBandwidth* and *subcarrierSpacing* associated to the UL BWP of the random-access resources;

3> set the *msg1-FrequencyStart, msg1-FDM* and *msg1-SubcarrierSpacing* associated to the random-access resources;

3> set *perRAInfoList* to indicate random access failure information as specified in 5.3.10.3;

2> initiate the connection re-establishment procedure as specified in subclause 5.3.7.

NOTE 1:    In the context above, "the UE configuration" includes state variables and parameters of each radio bearer.

1> else if T304 of a secondary cell group expires:

2> release dedicated preambles provided in *rach-ConfigDedicated,* if configured;

2> initiate the SCG failure information procedure as specified in subclause 5.7.3 to report SCG reconfiguration with sync failure, upon which the RRC reconfiguration procedure ends;

1> else if T304 expires when *RRCReconfiguration* is received via other RAT (HO to NR failure):

2> reset MAC;

2> perform the actions defined for this failure case as defined in the specifications applicable for the other RAT.

[...]

*** END Excerpt from 3GPP TS 38.331, v. 16.0.0 ***

*** BEGIN Excerpt from 3GPP TS 38.331 CR 1488 rev 2, Rel. 16 (03-2020) ***

5.7.x1     UE Information

5.7.x1.1    General

[...]

The UE information procedure is used by NG-RAN to request the UE to report information.

5.7.x1.2    Initiation

NG-RAN initiates the procedure by sending the *UEInformationRequest* message. NG-RAN should initiate this procedure only after successful security activation.

5.7.x1.3    Reception of the UEInformationRequest message

Upon receiving the *UEInformationRequest* message, the UE shall, only after successful security activation:

1> if the *logMeasReportReq* is present and if the RPLMN is included in *plmn-IdentityList* stored in *VarLogMeasReport*:

2> if *VarLogMeasReport* includes one or more logged measurement entries, set the contents of the *logMeasReport* in the *UEInformationResponse* message as follows:

3> include the *absoluteTimeStamp* and set it to the value of *absoluteTimeInfo* in the *VarLogMeasReport*;

3> include the *traceReference* and set it to the value of *traceReference* in the *VarLogMeasReport*;

3> include the *traceRecordingSessionRef* and set it to the value of *traceRecordingSessionRef* in the *VarLogMeasReport;*

3> include the *tce-Id* and set it to the value of *tce-Id* in the *VarLogMeasReport*;

3> include the *logMeasInfoList* and set it to include one or more entries from *VarLogMeasReport* starting from the entries logged first;

3> if the *VarLogMeasReport* includes one or more additional logged measurement entries that are not included in the *logMeasInfoList* within the *UEInformationResponse* message:

4> include the *logMeasAvailable;*

3> if the *VarLogMeasReport* includes one or more additional logged Bluetooth measurement entries that are not included in the *logMeasInfoList* within the *UEInformationResponse* message:

4> include the *logMeasAvailableBT;*

3> if the *VarLogMeasReport* includes one or more additional logged WLAN measurement entries that are not included in the *logMeasInfoList* within the *UEInformationResponse* message:

4> include the *logMeasAvailableWLAN;*

1> if *ra-ReportReq* is set to *true* and the UE has random access related information available in *VarRA-Report* and if the RPLMN is included in *plmn-IdentityList* stored in *VarRA-Report*:

2> set the *ra-Report* in the *UEInformationResponse* message to the value of *ra-Report* in *VarRA-Report;*

2> discard the *ra-Report* from *VarRA-Report* upon successful delivery of the *UEInformationResponse* message confirmed by lower layers;

1> if *rlf-ReportReq* is set to *true*:

2> if the UE has radio link failure information or handover failure information available in *VarRLF-Report* and if the RPLMN is included in *plmn-IdentityList* stored in *VarRLF-Report*:

3> set *timeSinceFailure* in *VarRLF-Report* to the time that elapsed since the last radio link or handover failure in NR;

3> set the *rlf-Report* in the *UEInformationResponse* message to the value of *rlf-Report* in *VarRLF-Report*;

3> discard the *rlf-Report* from *VarRLF-Report* upon successful delivery of the *UEInformationResponse* message confirmed by lower layers;

2> else if the UE has radio link failure information or handover failure information available in *VarRLF-Report* of TS 36.331 [10] and if the RPLMN is included in *plmn-IdentityList* stored in *VarRLF-Report* of TS 36.331 [10]:

3> set *timeSinceFailure* in *VarRLF-Report* of TS 36.331 [10] to the time that elapsed since the last radio link or handover failure in EUTRA;

3> set the *rlf-Report* in the *UEInformationResponse* message to the value of *rlf-Report* in *VarRLF-Report*;

3> discard the *rlf-Report* from *VarRLF-Report* upon successful delivery of the *UEInformationResponse* message confirmed by lower layers;

3> discard the *rlf-Report* from *VarRLF-Report* of TS 36.331 [10] upon successful delivery of the *UEInformationResponse* message confirmed by lower layers;

1> if *connEstFailReportReq* is set to *true* and the UE has connection establishment failure information in *VarConnEstFailReport* and if the RPLMN is equal to *plmn-Identity* stored in *VarConnEstFailReport*:

2> set *timeSinceFailure* in *VarConnEstFailReport* to the time that elapsed since the last connection establishment failure in NR;

2> set the *connEstFailReport* in the *UEInformationResponse* message to the value of *connEstFailReport* in *VarConnEstFailReport*;

2> discard the *connEstFailReport* from *VarConnEstFailReport* upon successful delivery of the *UEInformationResponse* message confirmed by lower layers;

1> if the *mobilityHistoryReportReq* is set to *true*:

2> include the *mobilityHistoryReport* and set it to include entries from *VarMobilityHistoryReport*;

2> include in the *mobilityHistoryReport* an entry for the current cell, possibly after removing the oldest entry if required, and set its fields as follows:

3> set *visitedCellId* to the global cell identity of the current cell:

3> set field *timeSpent* to the time spent in the current cell;

1> if the *logMeasReport* is included in the *UEInformationResponse*:

2> submit the *UEInformationResponse* message to lower layers for transmission via SRB2;

2> discard the logged measurement entries included in the *logMeasInfoList* from *VarLogMeasReport* upon successful delivery of the *UEInformationResponse* message confirmed by lower layers;

1> else:

2> submit the *UEInformationResponse* message to lower layers for transmission via SRB1.

*** END Excerpt from 3GPP TS 38.331 CR 1488 rev 2, Rel. 16 (03-2020) ***

SUMMARY

In some embodiments, a method performed by a wireless device for Cross-Link Interference (CLI) reporting is proposed. The method includes storing a CLI measurement. The method includes receiving a request to report the CLI measurement from a network node involved in a handover procedure for the wireless device. The method includes transmitting a CLI measurement report to the network node based on the CLI measurement. Thus, by providing CLI measurement reports, the method provides the benefit of enabling the network node serving the wireless device during handover to take actions to mitigate CLI and/or take distinct handover decisions to avoid CLI which can increase the likelihood of successful and low-latency handovers.

In some embodiments, wherein receiving the measurement configuration includes receiving the measurement configuration from the network node.

In some embodiments, the measurement configuration indicates the wireless device shall store the CLI measurement in case of a handover.

In some embodiments, the measurement configuration further indicates that the case of the handover is a handover from a first network node to a second network node. The handover procedure for the wireless device includes a handover procedure from the network node to a second network node.

In some embodiments, the measurement configuration is received in a RRCReconfiguration message.

In some embodiments, the method further includes transmitting an indication that CLI measurement information is available after storing the CLI measurement.

In some embodiments, transmitting the indication that the CLI measurement information is available includes transmitting, to the network node, an indication that CLI measurement information is available after storing the CLI measurement. In some embodiments, the indication includes (a) a flag associated with a Radio Link Failure (RLF) reporting framework, or (b) a CLI-specific indication.

In some embodiments, the indication that the CLI measurement information is available is transmitted in a RRCReestablishmentComplete message.

In some embodiments, the request to report the CLI measurement is received in a UEInformationRequest message, and the CLI measurement report is transmitted in a UEInformationResponse message.

In some embodiments, the CLI measurement report is provided in response to a radio link failure during the handover procedure. In some embodiments, the CLI measurement report is provided after successful completion of the handover procedure.

In some embodiments, the network node is a New Radio Base Station (gNB).

In some embodiments, the network node is a source gNB in the handover procedure for the wireless device.

In some embodiments, the CLI measurement includes a plurality of CLI resources, and wherein the CLI measurement report is descriptive of a subset of the plurality of CLI resources.

In some embodiments, the subset of CLI resources is associated with:
  (a) a certain frequency range;
  (b) one or more specific interferers that are close to a resource in which random access attempts and subsequent messages are transmitted; and/or
  (c) a time at which the subset of CLI resources were collected.

In some embodiments, the CLI measurement includes a plurality of CLI resources. Storing the CLI measurement includes storing a subset of CLI resources of the plurality of CLI resources based at least in part on a degree of interference associated with the subset of CLI resources.

In some embodiments, the request to report the stored CLI measurement from the network node includes a request to report the stored CLI measurement within (a) a RLF report or (b) a CLI-specific container.

In some embodiments, the CLI measurement includes measurement results per Sounding Reference Signal (SRS) resource, SRS resource(s) indexes, measurement results per CLI-Received Signal Strength Indicator (CLI-RSSI) resource, and/or CLI-RSSI resource(s) indexes.

In some embodiments a User Equipment (UE) for CLI reporting is proposed. The UE is adapted to store a CLI measurement. The UE is adapted to receive a request to report the CLI measurement from a network node involved in a handover procedure for the wireless device. The UE is adapted to transmit a CLI measurement report to the network node based on the CLI measurement.

In some embodiments a UE is proposed. The UE includes one or more transmitters, one or more receivers, and processing circuitry. The processing circuitry is configured to cause the UE to store a CLI measurement. The processing circuitry is configured to cause the UE to receive a request to report the CLI measurement from a network node involved in a handover procedure for the wireless device. The processing circuitry is configured to cause the UE to transmit a CLI measurement report to the network node based on the CLI measurement.

In some embodiments, a method performed by a network node for avoiding CLI is proposed. The method includes transmitting a request to report a CLI measurement to a wireless device, wherein the network node is involved in a handover procedure for the wireless device. The method includes receiving a CLI measurement report indicative of the CLI measurement from the wireless device.

In some embodiments, prior to transmitting the request to report the CLI measurement, the method includes transmitting, to the wireless device, a measurement configuration that indicates the wireless device shall store the CLI measurement in case of handover.

In some embodiments, the measurement configuration further indicates that the case of the handover is a handover from a first network node to a second network node. The handover procedure for the wireless device includes a handover procedure from the network node to a second network node.

In some embodiments, the measurement configuration is received in a RRCReconfiguration message.

In some embodiments, the method further includes receiving, from the wireless device an indication that CLI measurement information is available.

In some embodiments, the indication that the CLI measurement information is available includes (a) a flag associated with a RLF reporting framework, or (b) a CLI-specific indication.

In some embodiments, the indication that the CLI measurement information is available is transmitted in a RRCReestablishmentComplete message.

In some embodiments, the request to report the CLI measurement is received in a UEInformationRequest message, and the CLI measurement report is transmitted in a UEInformationResponse message.

In some embodiments, the CLI measurement report is received in response to a radio link failure during the handover procedure. In some embodiments, the CLI measurement report is received after successful completion of the handover procedure.

In some embodiments, the network node is a gNB. In some embodiments, the network node is a source gNB in the handover procedure for the wireless device.

In some embodiments, the CLI measurement includes a plurality of CLI resources, and wherein the CLI measurement report is descriptive of a subset of the plurality of CLI resources.

In some embodiments, the subset of CLI resources is associated with:

(a) a certain frequency range;

(b) one or more specific interferers that are close to a resource in which random access attempts and subsequent messages are transmitted; and/or (c) a time at which the subset of CLI resources were collected.

In some embodiments, the CLI measurement includes a plurality of CLI resources, and the CLI measurement report is indicative of a subset of CLI resources of the plurality of CLI resources of the CLI measurement, wherein the subset of CLI resources is associated with a degree of interference.

In some embodiments, the request to report the CLI measurement includes a request to report the CLI measurement within (a) a RLF report or (b) a CLI-specific container.

In some embodiments, the CLI measurement report is indicative of measurement results per SRS resource, SRS resource(s) indexes, measurement results per CLI-RSSI resource, and/or CLI-RSSI resource(s) indexes.

In some embodiments, a method performed by a network node for avoiding CLI is proposed. The method includes receiving CLI measurement information from a wireless device. The method includes, in a handover procedure, transmitting the CLI measurement information to another network node involved in the handover procedure.

In some embodiments, the method further includes receiving a handover acknowledgment from the other network node in response to transmitting the CLI measurement information.

In some embodiments, the handover acknowledgement includes radio reconfiguration information.

In some embodiments, the method further includes transmitting a reconfiguration message to the wireless device based on the radio reconfiguration information.

In some embodiments, the reconfiguration message is transmitted as a RRCReconfiguration message.

In some embodiments, the CLI measurement information is transmitted to the other network node in a handover request message.

In some embodiments, the CLI measurement information is received from the wireless device in a previous handover procedure.

In some embodiments, the wireless device providing the CLI measurement is involved in the handover procedure. In some embodiments, the wireless device providing the CLI measurement is not involved in the handover procedure.

In some embodiments, the CLI measurement information includes a plurality of CLI resources. Transmitting the CLI measurement information includes determining (502A) a subset of CLI resources of the plurality of CLI resources that are able to cause interference, and, in the handover procedure, transmitting (502B) the subset of CLI resources to the another network node involved in the handover procedure.

In some embodiments, the CLI measurement information includes a plurality of CLI resources and a respective plurality of time-frequency positions for the plurality of CLI resources.

In some embodiments, the network node is a source gNB in the handover procedure, and the other network node is a target gNB in the handover procedure.

In some embodiments, a network node for avoiding CLI is proposed. The network node is adapted to receive CLI measurement information from a wireless device. The network node is adapted to, in a handover procedure, transmit the CLI measurement information to another network node involved in the handover procedure.

In some embodiments, network node for avoiding CLI is proposed. The network node includes one or more transmitters, one or more receivers, and processing circuitry. The processing circuitry is configured to cause the network node to receive CLI measurement information from a wireless device. The processing circuitry is configured to cause the network node to, in a handover procedure, transmit the CLI measurement information to another network node involved in the handover procedure.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 5B is a flow diagram for a method for transmitting the CLI measurement information to another network node according to some embodiments of the present disclosure;

FIG. 11 is a flowchart illustrating a method in accordance with particular embodiments; and FIG. 12 is a flowchart illustrating a method in accordance with particular embodiments.

DETAILED DESCRIPTION

Figure 1:
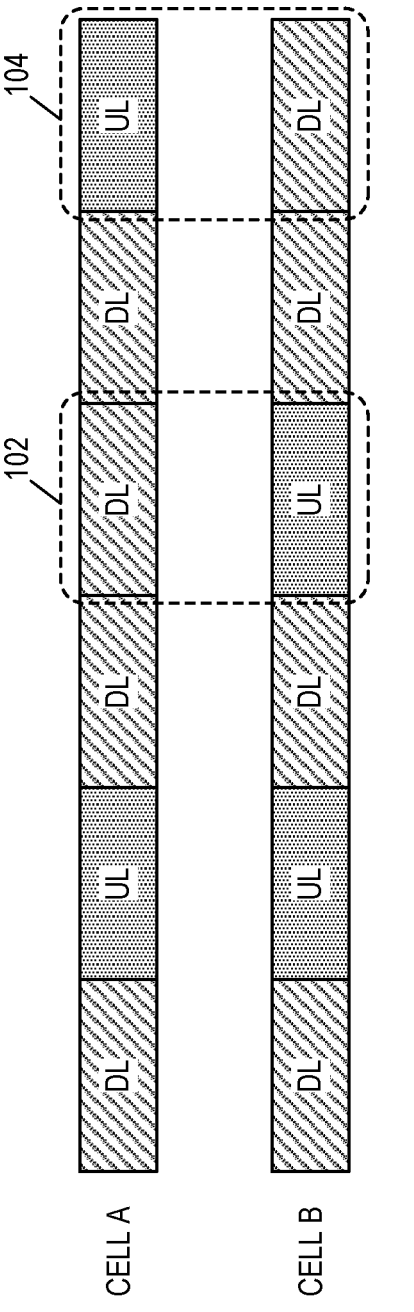
FIG. 1 is a block schematic diagram illustrating interference due to different TDD configurations in Cell A and Cell B.
Figure 2:
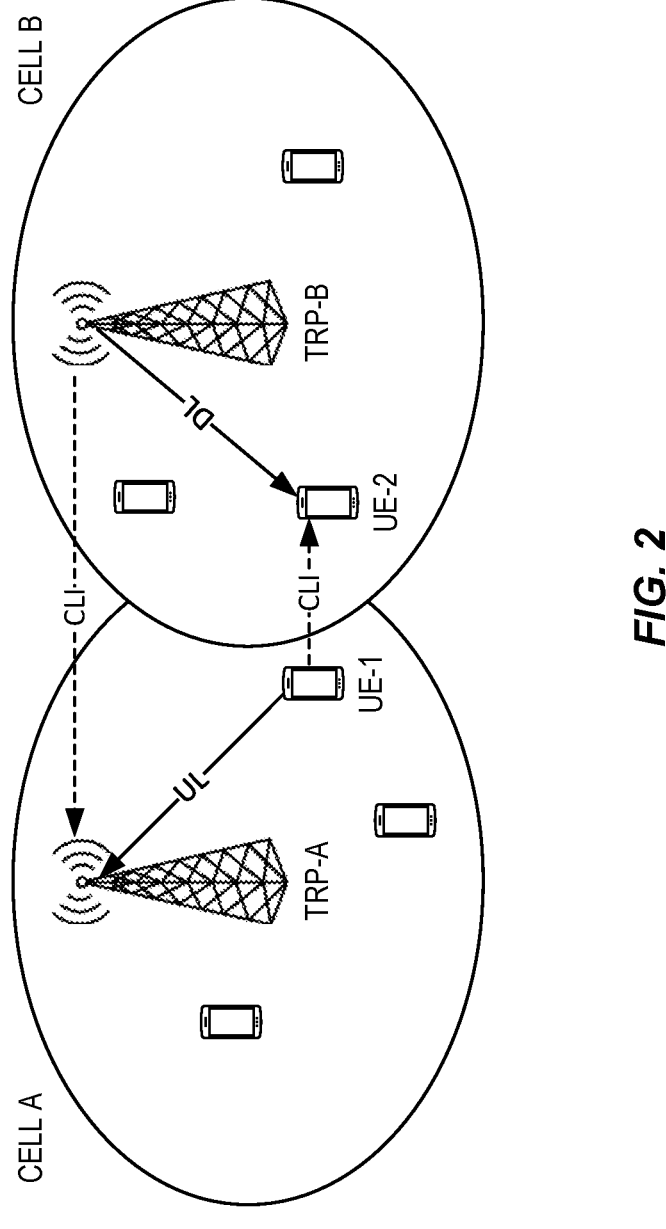
FIG. 2 is a schematic diagram of the CLI interference scenario of FIG. 1, considering a scheduling on the same or partially-overlapping time-frequency resources.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmission/Reception Point (TRP): In some embodiments, a TRP may be either a network node, a radio head, a spatial relation, or a Transmission Configuration Indicator (TCI) state. A TRP may be represented by a spatial relation or a TCI state in some embodiments. In some embodiments, a TRP may be using multiple TCI states.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Specifically, the handover procedure in NR may fail due to Cross-Link Interference (CLI). CLI is interference between neighboring cells due to different transmission directions on the neighboring cells on the same or partially-overlapping time-frequency resources. CLI, in turn, can cause handover procedure failure in NR. For example, Uplink (UL)/Downlink (DL) degradation (e.g., from CLI) may prevent the UE from successfully completing random access on the target cell. However, currently the UE cannot report CLI measurements associated with a handover failure. Hence the network cannot take into account CLI issues to tackle handover failure. Furthermore, even if the handover is successful, CLI interference may cause the handover to be delayed due to failure. As 5G NR is targeting minimal delays of the handover, it would be beneficial to the network to be able to identify any possible causes of handover delays and subsequently reconfigure the network to reduce the handover delays.

Certain aspects of the present disclosure and their embodiments may provide solutions to the aforementioned or other challenges. CLI reporting for handover is provided. In a first aspect, a wireless device (e.g., a UE) reports CLI measurements related to handover. CLI measurements are a measurement of CLI (i.e., a measurement of interference between neighboring cells due to different transmission directions on the neighboring cells on the same or partially-overlapping time-frequency resources). The wireless device may perform a method which includes one or more of the following:

Receiving a measurement configuration indicating that the UE shall store CLI measurements in case of handover;

Storing CLI measurements for reporting after handover failure/success;

Transmitting (e.g., to a source network node) an indication that stored CLI measurement report information is available;

Receiving an indication to report CLI measurements for Radio Link Failure; and

Transmitting (e.g., to the source network node) CLI measurement information (e.g., in association with a notification of a Radio Link Failure).

In another aspect, a network node (e.g., a radio access node and/or a source gNB) receives CLI measurements (e.g., from a UE) and pre-emptively avoids CLI at a network. The network node may perform a method which includes one or more of the following:

Sending a measurement configuration to a UE that indicates that the UE is to store CLI measurements in case of handover;

Receiving, from the UE, an indication that stored CLI measurement report information is available at the UE;

Transmitting, to the UE, an indication to report CLI measurements for Radio Link Failure;

Receiving CLI measurement information (e.g., one or more CLI measurements) from the UE (e.g., in association with a notification of a Radio Link Failure);

Transmitting at least a portion of the received CLI measurement information (e.g., at least one of the received CLI measurements) to a target network node (e.g., a target gNB);

Receiving an acknowledgement for sending a handover command to the UE; and

Transmitting a RRC reconfiguration to the UE.

There are, proposed herein, various embodiments which address one or more of the issues disclosed herein. In some embodiments, a method is performed by a wireless device for CLI reporting. The method comprises one or more of: storing a CLI measurement; receiving a request to report the CLI measurement from a network node involved in a handover procedure; and transmitting a CLI measurement report to the network node based on the CLI measurement.

Certain embodiments may provide one or more of the following technical advantage(s). Based on CLI measurement reports, a network serving a UE during a handover can take actions to mitigate CLI and/or take distinct handover decisions to avoid CLI which can increase the likelihood of successful and low-latency handovers. Such reports can also assist the network (e.g., at the target gNB or another network node), during handover, to create an RRC configuration that is tailored to the interference condition that a UE experiences. For instance, if the target gNB is made aware of high interference in or otherwise on certain resources, the target gNB can decide to release carriers that are affected by high interference based on CLI measurements provided by the UE.

Figure 3:
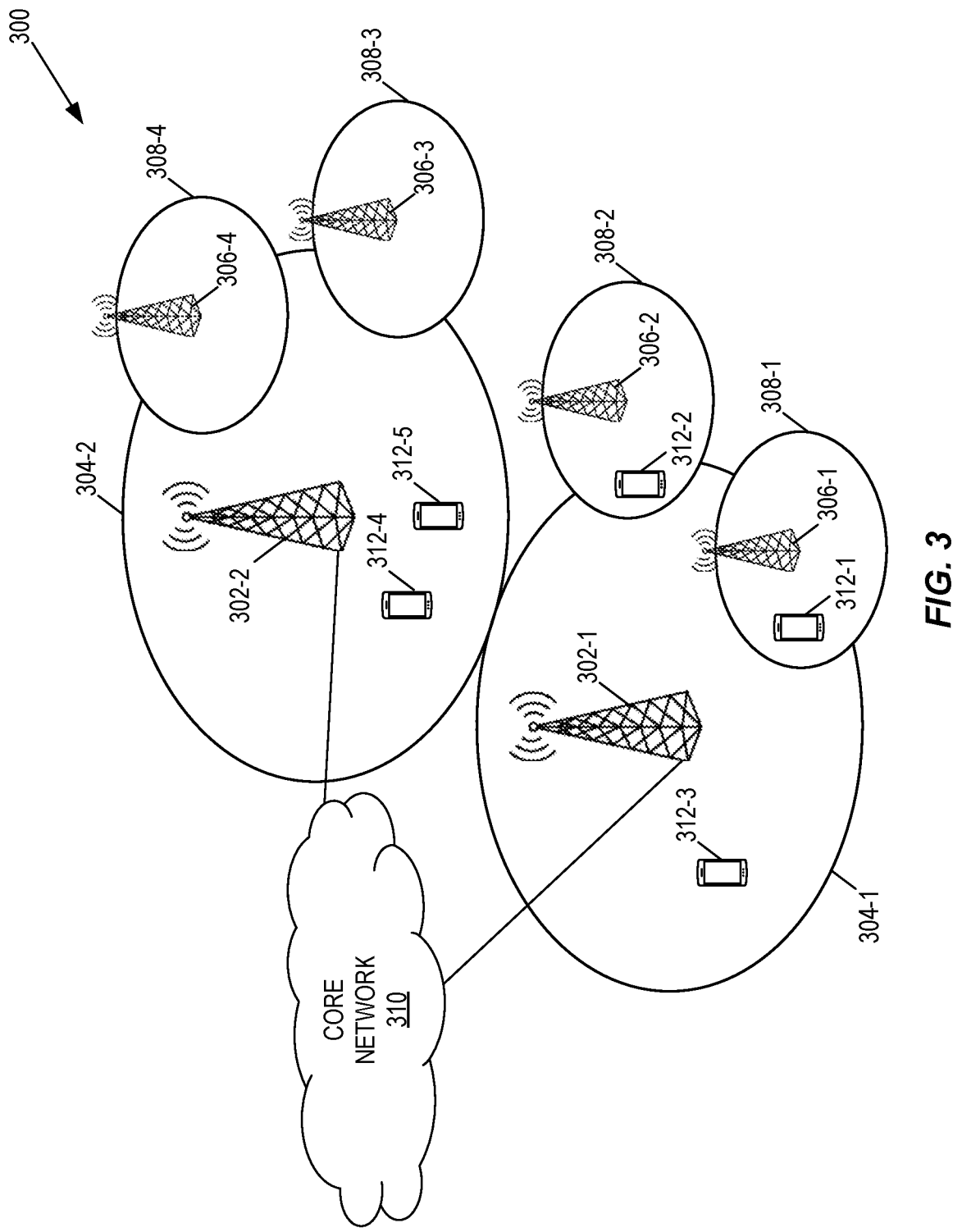
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a 5G system (5GS) including a Next Generation RAN (NG-RAN) and a 5G Core (5GC). In this example, the RAN includes base stations 302-1 and 302-2, which in the 5GS include NR base stations (gNBs) and optionally Next Generation eNBs (NG-eNBs) (e.g., LTE RAN nodes connected to the 5GC), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5GC. The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

Embodiments of the cellular communications system 300 described herein provide a framework for CLI measurements to be retrieved by the network (e.g., by the RAN) in handover scenarios. During handover, in order to allow for the network to establish the reason that handover failure or partial degradation of the handover and/or delays of handover occurs, in one embodiment (described below with respect to FIG. 4) a wireless communication device 312 (e.g., UE) stores CLI measurement reports after handover failure, if available, and indicates to the network (e.g., via the base station 302) that it has CLI measurement reports available. Hence, the network may retrieve those CLI measurements from the UE to know whether there is cross-link interference that may be the cause of the handover degradation or failure.

In case of a handover request (described below with respect to FIG. 5), a source network node (e.g., a base station 302 initiating a handover) can include CLI measurements to the target network node (e.g., another base station 302 receiving the handover request). This allows the network to pre-emptively schedule the UE such that the CLI is avoided, by means of allocating the UE with specific random access resources that avoid the CLI.

Figure 4:
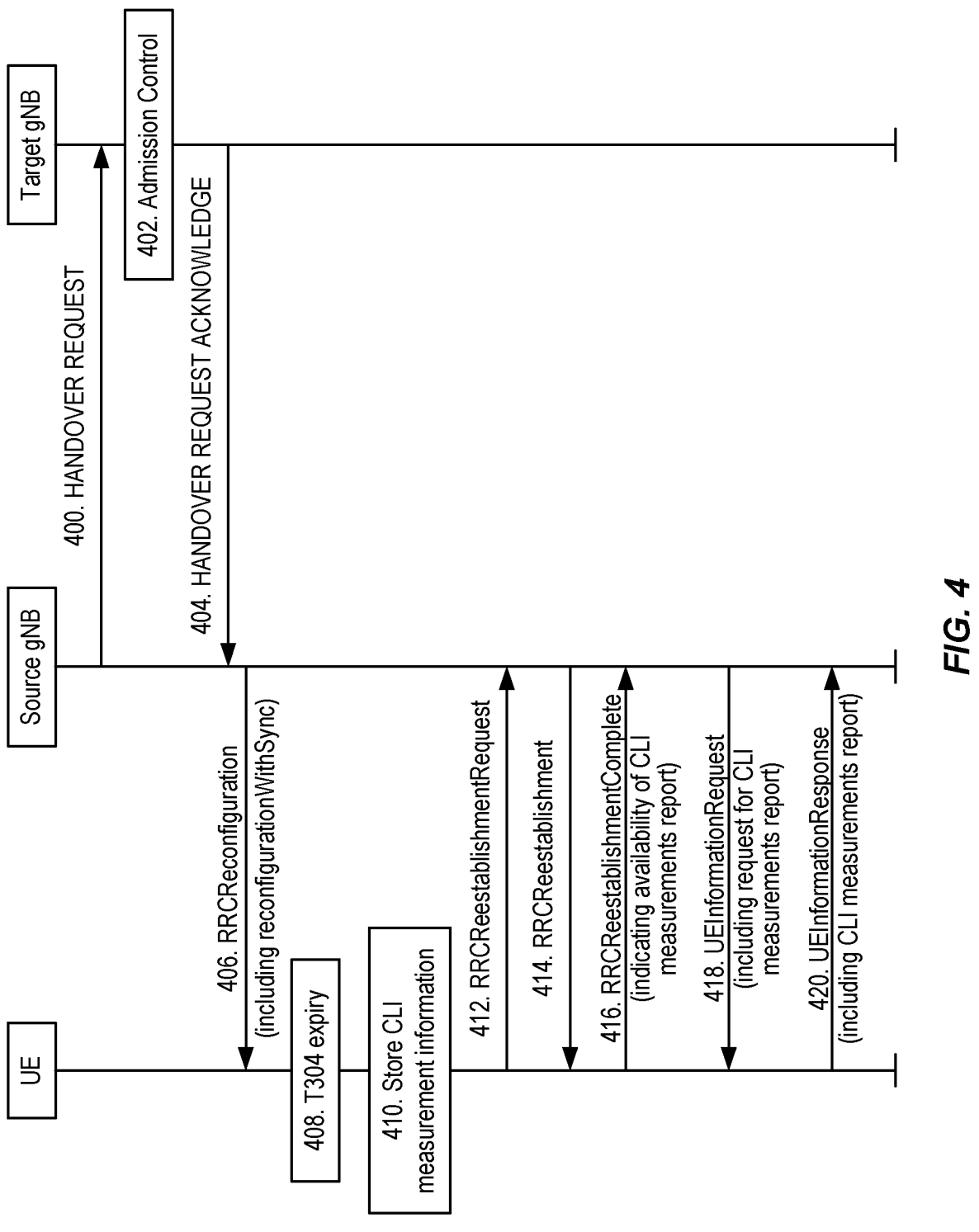
FIG. 4 is a flow diagram of a process for CLI measurement reporting during a handover according to a first solution described herein

FIG. 4 is a flow diagram of a process for CLI measurement reporting during a handover according to a first solution described herein. The process may begin with the UE (e.g., UE 312 of FIG. 3, etc.) receiving a measurement configuration indicating that the UE shall store CLI measurements in case of handover. In some embodiments, the CLI measurement configuration includes one or more of the following: a time-frequency position of the resource to measure CLI, with what threshold that a measurement is to be reported to the network, and so on.

In a first embodiment, the UE is configured to store CLI measurements when performing handover to another node (e.g., a handover procedure from the source gNB to a second gNB, etc.). A source gNB (e.g., a gNB already in communication with the UE, a gNB involved in a handover procedure with the UE, etc.) initiates a handover by sending a handover request to a target gNB (block 400). The target gNB performs an admission control protocol, which can include configuring required resources for the handover (block 402) and sends an acknowledgement of the handover request to the source gNB (block 404). The source gNB sends an RRCReconfiguration message, which includes a reconfigurationWithSync and can indicate that the UE shall store CLI measurements (block 406). In one solution, due to the fact that the CLI has a maximum of 64 resources, the amount of signaling required for all resources may be very large and it is likely that there are only a few number of resources that are causing the interference that causes deterioration of the handover. To reduce the amount of signaling to the most important interferers, the UE is configured to only store the CLI resources that have the largest amount of interference (e.g., storing CLI resources based on a degree of interference, etc.). This can for instance be done through configuring a maximum number of resources to be reported for the handover successful or failure. In other words, the UE can provide a CLI measurement report that is descriptive of a subset of the CLI measurement(s) (e.g., a subset of CLI resources, etc.).

In another solution only a subset of CLI resources are configured to be reported by the network for handover success or failure. This can for instance be done through a flag in the CLI resource configuration telling whether the resource should be reported or not. In another solution the CLI resource configuration in a certain frequency range is configured to be reported, for instance associated with the bandwidth-part configuration. In a further solution, the UE is configured to only report CLI from interferers that are close to the resources where the random access attempts and the subsequent messages are transmitted. In other words, the subset of the CLI measurement (e.g., subset of CLI resources) provided by the UE may be associated with a certain frequency range, specific interferers, a time at which the subset of the measurement was collected, etc.

After expiry of timer T304 (block 408, triggered by receipt of the RRCReconfiguration message), the UE stores CLI measurements for reporting (block 410). The handover procedure continues with the UE sending an RRCReestablishmentRequest message to the source gNB (block 412), and receiving an RRCReestablishment message in response (block 414).

The UE then transmits (e.g., to the source gNB) an indication that stored CLI measurement report information is available. After having attempted the handover and after having either success or failure, the UE in a first solution will indicate that it has stored CLI measurements available. This is done through a flag (e.g., an indication, etc.) that tells the network that it has measurement resources available. There are two non-exclusive solutions (e.g., both can be possible). In one solution, this flag can either be seen as part of (e.g., associated with) the current Radio Link Failure (RLF)-reporting framework for handover failures. In another solution, the flag is indicated by a CLI-specific indication that specifically tells that there are CLI-measurements available, which is useful for both the case of handover failure and in the case of handover success that is delayed due to CLI-interference. For example, one or both of these approaches can be provided to the source gNB through an RRCReestablishmentComplete message (block 416).

The UE receives an indication to report CLI measurements for RLF, such as through a UEInformationRequest message (block 418) (e.g., from the source gNB (e.g., a node involved in a handover procedure for the UE, etc.)). The request to report stored CLI measurements can either be done through telling the UE to transmit its RLF report or the CLI-specific container, which can depend on whether handover was a failure or a success with delays.

The UE then transmits (e.g., to the source gNB) CLI measurement information, such as through a UEInformationResponse message (block 420) (e.g., a CLI measurement report that includes CLI resources, etc.). The transmission of the CLI measurements can be done as mentioned earlier through the RLF report or a CLI-specific container. To save signaling, in one embodiment the UE may decide on its own how many CLI resources that it wants to transmit. In one embodiment, the UE does not include resources that have been stored for too long. In one example, it may be "hard-coded" that the UE shall not include CLI measurements that have been stored more than X seconds. In another embodiment, the UE only sends the CLI measurements in the frequency range where the UE attempted handover.

Figure 5A:
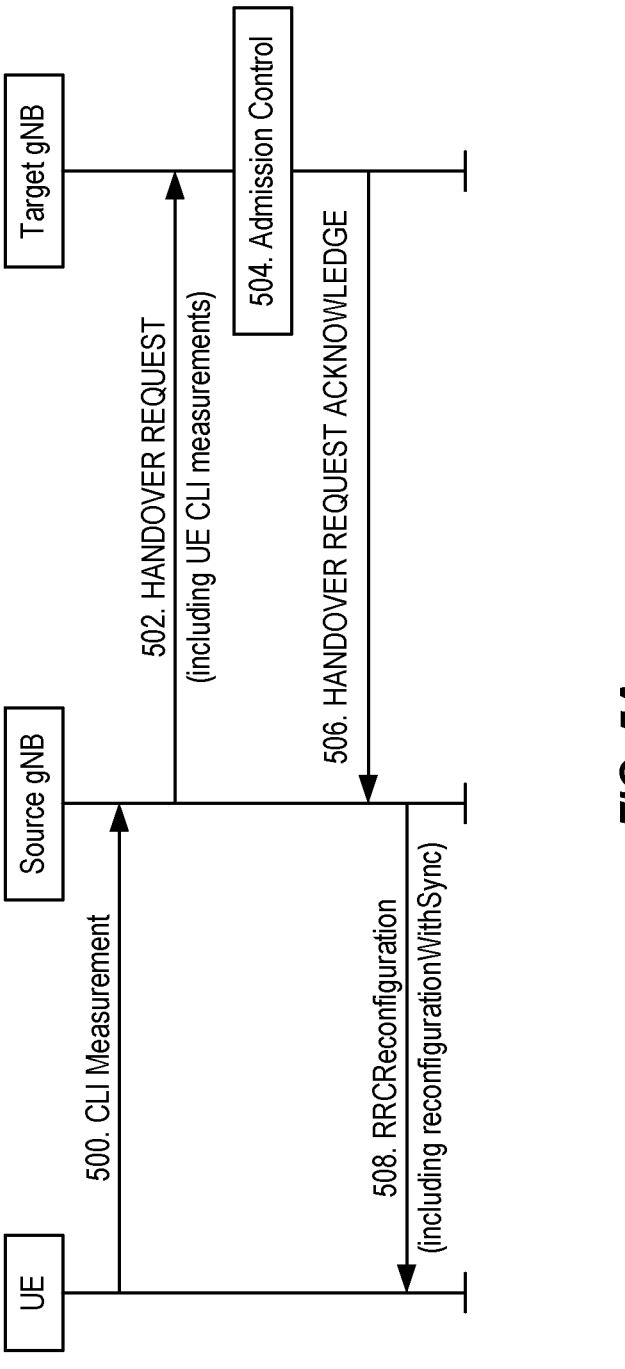
FIG. 5A is a flow diagram of a process for CLI measurement reporting in a handover request message according to a second solution described herein.

FIG. 5A is a flow diagram of a process for CLI measurement reporting in a handover request message according to a second solution described herein. The source gNB receives a CLI measurement (block 500) (e.g., a plurality of CLI resources, etc.). This CLI measurement is received from the UE as in traditional approaches. It can, for instance, be polled from the UE in advance in order to identify the interference situation that the UE is in.

The source gNB then transmits the CLI measurements to the target gNB (e.g., CLI measurement information, etc.). To allow for the source gNB to identify the interference-free configurations the CLI measurement is sent to the target gNB along with the handover request (block 502). In one embodiment only the largest interferers are included. In another embodiment, the source gNB only includes the CLI measurements that are predicted to be able to cause interference. For instance, this can be accomplished using a prediction algorithm. To allow for the target gNB to correctly identify the time-frequency position of the resources, the source gNB can include the time-frequency positions of each reported resource. In other words, the source gNB can include a respective plurality of time-frequency positions for the plurality of CLI resources of the CLI measurement information.

FIG. 5B is a flow diagram for a method for transmitting the CLI measurement information to another network node according to some embodiments of the present disclosure. Turning to FIG. 5B, to transmit the CLI measurements to the target gNB as described with regards to block 502 of FIG. 5A, the source gNB can determine a subset of CLI resources from the CLI measurement info (e.g., a plurality of CLI resources) that are able to cause interference (block 502A). Next, the source gNB can, in the handover procedure, transmit the subset of CLI resources to another network node (e.g., the target gNB) involved in the handover procedure (block 502B).

Returning to FIG. 5A, similarly to FIG. 4, in response to the handover request, the target gNB performs an admission control protocol (block 504). The source gNB receives an acknowledgement for sending the handover request to the UE. For example, the source gNB can receive the acknowledgement along with the configuration to perform the handover (block 506). The source gNB then transmits an RRC reconfiguration to the UE (block 508).

It is possible that existing 3GPP technical documentation, such as 3GPP TS 38.331, may be amended in the future to incorporate various embodiments of the present disclosure. To provide an illustrative example, various example amendments corresponding to example embodiments of the present disclosure described above have been made to portions of 3GPP TS 38.331, v. 16.0.0, RRC protocol specification, Rel. 16 (03-2020) below. Additions are indicated in underlined text, and deletions are indicated in stricken-through text.

*** BEGIN Example amendments to 3GPP TS 38.331, v. 16.0.0 ***

5.3.5.8.3  T304 expiry (Reconfiguration with sync Failure)

The UE shall:

1> if T304 of the MCG expires:

2> release dedicated preambles provided in *rach-ConfigDedicated* if configured;

2> revert back to the UE configuration used in the source PCell;

2> store the following handover failure information in *VarRLF-Report* by setting its fields as follows:

3> clear the information included in *VarRLF-Report*, if any;

3> set the *plmn-IdentityList* to include the list of EPLMNs stored by the UE (i.e. includes the RPLMN);

3> set the *measResultLastServCell* to include the RSRP, RSRQ and the available SINR, of the source PCell based on the available SSB and CSI-RS measurements collected up to the moment the UE detected handover failure;

3> set the *ssbRLMConfigBitmap* and/or *csi-rsRLMConfigBitmap* in *measResultLastServCell* to include the radio link monitoring configuration of the source PCell;

3> for each of the configured *measObjectNR* in which measurements are available;

4> if the SS/PBCH block-based measurement quantities are available;

5> set the *measResultListNR* in *measResultNeighCells* to include all the available measurement quantities of the best measured cells associated to the *measObjectNR*, other than the source PCell, ordered such that the cell with highest SS/PBCH block RSRP is listed first if SS/PBCH block RSRP measurement results are available, otherwise the cell with highest SS/PBCH block RSRQ is listed first if SS/PBCH block RSRQ measurement results are available, otherwise the cell with highest SS/PBCH block SINR is listed first, based on the available SS/PBCH block based measurements collected up to the moment the UE detected handover failure;

6> for each neighbour cell included, include the optional fields that are available;

4> if the CSI-RS based measurement quantities are available;

5> set the *measResultListNR* in *measResultNeighCells* to include all the available measurement quantities of the best measured cells, other than the source PCell, ordered such that the cell with highest CSI-RS RSRP is listed first if CSI-RS RSRP measurement results are available, otherwise the cell with highest CSI-RS RSRQ is listed first if CSI-RS RSRQ measurement results are available, otherwise the cell with highest CSI-RS SINR is listed first, based on the available CSI-RS based measurements collected up to the moment the UE detected handover failure;

6> for each neighbour cell included, include the optional fields that are available;

3> for each of the configured EUTRA frequencies in which measurements are available;

4> set the *measResultListEUTRA* in *measResultNeighCells* to include the best measured cells ordered such that the cell with highest RSRP is listed first if RSRP measurement results are available, otherwise the cell with highest RSRQ is listed first, and based on measurements collected up to the moment the UE detected radio link failure;

5> for each neighbour cell included, include the optional fields that are available;

NOTE 2:    The measured quantities are filtered by the L3 filter as configured in the mobility measurement configuration.  The measurements are based on the time domain measurement resource restriction, if configured. Blacklisted cells are not required to be reported.

3> if there is at least one *MeasObjectCLI* configured on NR MCG for which a *measId* is configured and measurement results are available:

4> set the *measResultCLI* to include the most interfering SRS resources or most interfering CLI-RSSI resources up to *maxReportCLI* in accordance with the following:

5> include the SRS resource included in the *cli-TriggeredList* as defined within the *VarMeasReportList* for this *measId*;

5> include the CLI-RSSI resource included in the *cli-TriggeredList* as defined within the *VarMeasReportList* for this *measId*;

4> for each SRS resource that is included in the *measResultCLI*:

5> include the *srs-ResourceId*;

5> set *srs-RSRP-Result* to include the layer 3 filtered measured results in decreasing order, i.e. the most interfering SRS resource is included first;

4> for each CLI-RSSI resource that is included in the *measResultCLI*:

5> include the *rssi-ResourceId*;

5> set *cli-RSSI-Result* to include the layer 3 filtered measured results in decreasing order, i.e. the most interfering CLI-RSSI resource is included first;

3> if detailed location information is available, set the content of the *LocationInfo* as follows:

4> if available, set the *commonLocationInfo* to include the detailed location information;

4> if available, set the *bt-LocationInfo* to include the Bluetooth measurement results, in order of decreasing RSSI for Bluetooth beacons;

4> if available, set the *wlan-LocationInfo* to include the WLAN measurement results, in order of decreasing RSSI for WLAN APs;

4> if available, set the *sensor-LocationInfo* to include the sensor measurement results;

3> set the *failedPCellId* to the global cell identity and tracking area code, if available, and otherwise to the physical cell identity and carrier frequency of the target PCell of the failed handover;

3> include *previousPCellId* and set it to the global cell identity and tracking area code of the PCell where the last *RRCReconfiguration* message including *reconfigurationWithSync* was received;

3> set the *timeConnFailure* to the elapsed time since reception of the last *RRCReconfiguration* message including the *reconfigurationWithSync*;

3> set the *connectionFailureType* to *hof*;

3> set the *c-RNTI* to the C-RNTI used in the source PCell;

3> set the *absoluteFrequencyPointA* to indicate the absolute frequency of the reference resource block associated to the random-access resources;

3> set the *locationAndBandwidth* and *subcarrierSpacing* associated to the UL BWP of the random-access resources;

3> set the *msg1-FrequencyStart, msg1-FDM* and *msg1-SubcarrierSpacing* associated to the random-access resources;

3> set *perRAInfoList* to indicate random access failure information as specified in 5.3.10.3;

2> initiate the connection re-establishment procedure as specified in subclause 5.3.7.

NOTE 1:    In the context above, "the UE configuration" includes state variables and parameters of each radio bearer.

1> else if T304 of a secondary cell group expires:

2> release dedicated preambles provided in *rach-ConfigDedicated*, if configured;

2> initiate the SCG failure information procedure as specified in subclause 5.7.3 to report SCG reconfiguration with sync failure, upon which the RRC reconfiguration procedure ends;

1> else if T304 expires when *RRCReconfiguration* is received via other RAT (HO to NR failure):

2> reset MAC;

2> perform the actions defined for this failure case as defined in the specifications applicable for the other RAT.

[...]

5.7.x1    UE Information

5.7.x1.1    General

[...]

The UE information procedure is used by NG-RAN to request the UE to report information.

5.7.x1.2    Initiation

NG-RAN initiates the procedure by sending the *UEInformationRequest* message. NG-RAN should initiate this procedure only after successful security activation.

5.7.x1.3    Reception of the UEInformationRequest message

Upon receiving the *UEInformationRequest* message, the UE shall, only after successful security activation:

> 1> if the *logMeasReportReq* is present and if the RPLMN is included in *plmn-IdentityList* stored in *VarLogMeasReport*:
>
>> 2> if *VarLogMeasReport* includes one or more logged measurement entries, set the contents of the *logMeasReport* in the *UEInformationResponse* message as follows:
>>
>>> 3> include the *absoluteTimeStamp* and set it to the value of *absoluteTimeInfo* in the *VarLogMeasReport*;
>>>
>>> 3> include the *traceReference* and set it to the value of *traceReference* in the *VarLogMeasReport*;
>>>
>>> 3> include the *traceRecordingSessionRef* and set it to the value of *traceRecordingSessionRef* in the *VarLogMeasReport*;
>>>
>>> 3> include the *tce-Id* and set it to the value of *tce-Id* in the *VarLogMeasReport*;
>>>
>>> 3> include the *logMeasInfoList* and set it to include one or more entries from *VarLogMeasReport* starting from the entries logged first;
>>>
>>> 3> if the *VarLogMeasReport* includes one or more additional logged measurement entries that are not included in the *logMeasInfoList* within the *UEInformationResponse* message:
>>>
>>>> 4> include the *logMeasAvailable*;
>>>
>>> 3> if the *VarLogMeasReport* includes one or more additional logged Bluetooth measurement entries that are not included in the *logMeasInfoList* within the *UEInformationResponse* message:
>>>
>>>> 4> include the *logMeasAvailableBT*;
>>>
>>> 3> if the *VarLogMeasReport* includes one or more additional logged WLAN measurement entries that are not included in the *logMeasInfoList* within the *UEInformationResponse* message:
>>>
>>>> 4> include the *logMeasAvailableWLAN*;
>
> 1> if *ra-ReportReq* is set to *true* and the UE has random access related information available in *VarRA-Report* and if the RPLMN is included in *plmn-IdentityList* stored in *VarRA-Report*:

2> set the *ra-Report* in the *UEInformationResponse* message to the value of *ra-Report* in *VarRA-Report*;

2> discard the *ra-Report* from *VarRA-Report* upon successful delivery of the *UEInformationResponse* message confirmed by lower layers;

1> if *rlf-ReportReq* is set to *true*:

2> if the UE has radio link failure information or handover failure information available in *VarRLF-Report* and if the RPLMN is included in *plmn-IdentityList* stored in *VarRLF-Report*:

3> set *timeSinceFailure* in *VarRLF-Report* to the time that elapsed since the last radio link or handover failure in NR;

3> set the *rlf-Report* in the *UEInformationResponse* message to the value of *rlf-Report* in *VarRLF-Report*;

3> discard the *rlf-Report* from *VarRLF-Report* upon successful delivery of the *UEInformationResponse* message confirmed by lower layers;

2> else if the UE has radio link failure information or handover failure information available in *VarRLF-Report* of TS 36.331 [10] and if the RPLMN is included in *plmn-IdentityList* stored in *VarRLF-Report* of TS 36.331 [10]:

3> set *timeSinceFailure* in *VarRLF-Report* of TS 36.331 [10] to the time that elapsed since the last radio link or handover failure in EUTRA;

3> set the *rlf-Report* in the *UEInformationResponse* message to the value of *rlf-Report* in *VarRLF-Report*;

3> discard the *rlf-Report* from *VarRLF-Report* upon successful delivery of the *UEInformationResponse* message confirmed by lower layers;

3> discard the *rlf-Report* from *VarRLF-Report* of TS 36.331 [10] upon successful delivery of the *UEInformationResponse* message confirmed by lower layers;

1> if *connEstFailReportReq* is set to *true* and the UE has connection establishment failure information in *VarConnEstFailReport* and if the RPLMN is equal to *plmn-Identity* stored in *VarConnEstFailReport*:

2> set *timeSinceFailure* in *VarConnEstFailReport* to the time that elapsed since the last connection establishment failure in NR;

2> set the *connEstFailReport* in the *UEInformationResponse* message to the value of *connEstFailReport* in *VarConnEstFailReport*;

2> discard the *connEstFailReport* from *VarConnEstFailReport* upon successful delivery of the *UEInformationResponse* message confirmed by lower layers;

1> if the *mobilityHistoryReportReq* is set to *true*:

2> include the *mobilityHistoryReport* and set it to include entries from *VarMobilityHistoryReport*;

2> include in the *mobilityHistoryReport* an entry for the current cell, possibly after removing the oldest entry if required, and set its fields as follows:

3> set *visitedCellId* to the global cell identity of the current cell:

3> set field *timeSpent* to the time spent in the current cell;

1> if the *logMeasReport* is included in the *UEInformationResponse*:

2> submit the *UEInformationResponse* message to lower layers for transmission via SRB2;

2> discard the logged measurement entries included in the *logMeasInfoList* from *VarLogMeasReport* upon successful delivery of the *UEInformationResponse* message confirmed by lower layers;

1> else:

2> submit the *UEInformationResponse* message to lower layers for transmission via SRB1.

–     *UEInformationResponse*

The *UEInformationResponse* message is used by the UE to transfer the information requested by the Network.

Signalling radio bearer: SRB1 or SRB2 (when logged measurement information is included)

RLC-SAP: AM

Logical channel: DCCH

Direction: UE to Network

[...]

*UEInformationResponse* message

```
-- ASN1START
-- TAG-UEINFORMATIONRESPONSE-START

UEInformationResponse-r16 ::=   SEQUENCE {
    rrc-TransactionIdentifier   RRC-TransactionIdentifier,
    criticalExtensions          CHOICE {
        ueInformationResponse-r16   UEInformationResponse-r16-
IEs,
        criticalExtensionsFuture    SEQUENCE {}
    }
}

UEInformationResponse-r16-IEs ::=   SEQUENCE {
    logMeasReport-r16           LogMeasReport-r16
OPTIONAL,
    connEstFailReport-r16       ConnEstFailReport-r16
OPTIONAL,
    ra-ReportList-r16           RA-ReportList-r16
OPTIONAL,
    rlf-Report-r16              RLF-Report-r16
OPTIONAL,
```

```
    mobilityHistoryReport-r16    MobilityHistoryReport-r16
OPTIONAL,
    nonCriticalExtension        SEQUENCE {}
OPTIONAL
}

LogMeasReport-r16 ::=         SEQUENCE {
    absoluteTimeStamp-r16        AbsoluteTimeInfo-r16,
    traceReference-r16           TraceReference-r16,
    traceRecordingSessionRef-r16 OCTET STRING (SIZE (2)),
    tce-Id-r16                   OCTET STRING (SIZE (1)),
    logMeasInfoList-r16          LogMeasInfoList-r16,
    logMeasAvailable-r16         ENUMERATED {true}
OPTIONAL,
    logMeasAvailableBT-r16       ENUMERATED {true}
OPTIONAL,
    logMeasAvailableWLAN-r16     ENUMERATED {true}
OPTIONAL,
    ...
}

LogMeasInfoList-r16 ::=      SEQUENCE (SIZE (1..maxLogMeasReport-
r16)) OF LogMeasInfo-r16

LogMeasInfo-r16 ::=          SEQUENCE {
    locationInfo-r16             LocationInfo-r16
OPTIONAL,
    relativeTimeStamp-r16        INTEGER (0..7200),
    servCellIdentity-r16         CGI-Info-Logging-r16,
    measResultServingCell-r16    MeasResultServingCell-r16
OPTIONAL,
    measResultNeighCells-r16     SEQUENCE {
        measResultNeighCellListNR   MeasResultListLogging2NR-r16
OPTIONAL,
        measResultNeighCellListEUTRA  MeasResultList2EUTRA-r16
OPTIONAL
    },
    anyCellSelectionDetected-r16  ENUMERATED {true}
OPTIONAL
}

ConnEstFailReport-r16ConnEstFailInfo-r16 ::=  SEQUENCE {
    measResultFailedCell-r16    MeasResultFailedCell-r16,
    locationInfo-r16            LocationInfo-r16
OPTIONAL,
    measResultNeighCells-r16    SEQUENCE {
        measResultNeighCellListNR  MeasResultList2NR-r16
OPTIONAL,
        measResultNeighCellListEUTRA  MeasResultList2EUTRA-r16
OPTIONAL
    },
    numberOfConnFail-r16        INTEGER (0..7),
```

```
    perRAInfoList-r16          PerRAInfoList-r16
OPTIONAL,
    timeSinceFailure-r16       TimeSinceFailure-r16,
    ...
}

MeasResultServingCell-r16 ::=  SEQUENCE {
    physCellId                 PhysCellId
OPTIONAL,
    resultsSSB-Cell            MeasQuantityResults
OPTIONAL,
    resultsSSB                 SEQUENCE{
        best-ssb-Index           SSB-Index,
        best-ssb-Results         MeasQuantityResults   OPTIONAL,
        numberOfGoodSSB          INTEGER (1..maxNrofSSBs)
OPTIONAL
}
OPTIONAL,
    ...
}

MeasResultFailedCell-r16 ::=  SEQUENCE {
    cgi-Info                   CGI-Info-Logging-r16,
    physCellId-r16             PhysCellId
OPTIONAL,
    measResult-r16             SEQUENCE {
        cellResults-r16            SEQUENCE{
            resultsSSB-Cell-r16        MeasQuantityResults
OPTIONAL
        },
        rsIndexResults-r16         SEQUENCE{
            resultsSSB-Indexes-r16     ResultsPerSSB-IndexList
OPTIONAL
        }
OPTIONAL
    }
}

RA-ReportList-r16 ::= SEQUENCE (SIZE (1..maxRAReport)) OF RA-
Report-r16

RA-Report-r16 ::=              SEQUENCE {
    cellId-r16                    CGI-Info-LoggingDetailed-r16,
    absoluteFrequencyPointA-r16 ARFCN-ValueNR,
    locationAndBandwidth-r16    INTEGER (0..37949),
    subcarrierSpacing-r16       SubcarrierSpacing,
    msg1-FrequencyStart-r16     INTEGER
(0..maxNrofPhysicalResourceBlocks-1),
    msg1-SubcarrierSpacing-r16  SubcarrierSpacing,
    msg1-FDM-r16                ENUMERATED {one, two, four,
eight},
```

```
    raPurpose-r16                   ENUMERATED {accessRelated,
beamFailureRecovery, reconfigurationWithSync, ulUnSynchronized,
schedulingRequestFailure, noPUCCHResourceAvailable,
sCellAdditionTAAdjestment, requestForOtherSI, spare8, spare7, spare6, spare5, spare4,
spare3, spare2, spare1},
    perRAInfoList-r16               PerRAInfoList-r16
}

PerRAInfoList-r16 ::= SEQUENCE (SIZE (1..200)) OF PerRAInfo-r16

PerRAInfo-r16 ::=              CHOICE {
    perRASSBInfoList-r16          PerRASSBInfo-r16,
    perRACSI-RSInfoList-r16       PerRACSI-RSInfo-r16
}

PerRASSBInfo-r16 ::=          SEQUENCE {
    ssb-Index-r16                SSB-Index,
    numberOfPreamblesSentOnSSB-r16  INTEGER (1..200),
    perRAAttemptInfoList-r16     PerRAAttemptInfoList-r16
}

PerRACSI-RSInfo-r16 ::=       SEQUENCE {
    csi-RS-Index-r16             CSI-RS-Index,
    numberOfPreamblesSentOnCSI-RS-r16  INTEGER (1..200),
    perRAAttemptInfoList-r16     PerRAAttemptInfoList-r16
}

PerRAAttemptInfoList-r16 ::=  SEQUENCE (SIZE (1..200)) OF
PerRAAttemptInfo-r16

PerRAAttemptInfo-r16 ::=      SEQUENCE {
    contentionDetected-r16       BOOLEAN,
    dlRSRPAboveThreshold-r16     BOOLEAN,
    ...
}

RLF-Report-r16 ::=            CHOICE {
    nr-RLF-Report-r16            SEQUENCE {
        measResultLastServCell-r16  MeasResultRLFNR-r16,
        measResultNeighCells-r16    SEQUENCE {
            measResultListNR-r16        MeasResultList2NR-r16
OPTIONAL,
            measResultListEUTRA-r16     MeasResultList2EUTRA-r16
OPTIONAL
        }
OPTIONAL,
        c-RNTI-r16                  RNTI-Value,
        previousPCellId-r16         CGI-Info-LoggingDetailed-r16
OPTIONAL,
        failedPCellId-r16           CHOICE {
```

```
        cellGlobalId-r16            CGI-Info-LoggingDetailed-
r16,
        pci-arfcn-r16              SEQUENCE {
            physCellId-r16            PhysCellId,
            carrierFreq-r16          ARFCN-ValueNR
        }
    }
OPTIONAL,
        reestablishmentCellId-r16   CGI-Info-Logging-r16
OPTIONAL,
        timeConnFailure-r16         INTEGER (0..1023)
OPTIONAL,
        timeSinceFailure-r16        TimeSinceFailure-r16,
        connectionFailureType-r16   ENUMERATED {rlf, hof}
OPTIONAL,
        rlf-Cause-r16               ENUMERATED {
t310-Expiry, randomAccessProblem,
rlc-MaxNumRetx, beamFailureRecoveryFailure, spare4, spare3,
spare2, spare1},
        locationInfo-r16            LocationInfo-r16
OPTIONAL,
        absoluteFrequencyPointA-r16 ARFCN-ValueNR
OPTIONAL,
        locationAndBandwidth-r16    INTEGER (0..37949)
OPTIONAL,
        subcarrierSpacing-r16       SubcarrierSpacing
OPTIONAL,
        msg1-FrequencyStart-r16     INTEGER
(0..maxNrofPhysicalResourceBlocks-1)    OPTIONAL,
        msg1-SubcarrierSpacing-r16  SubcarrierSpacing
OPTIONAL,
        msg1-FDM-r16                ENUMERATED {one, two, four,
eight}    OPTIONAL,
        perRAInfoList-r16          PerRAInfoList-r16
OPTIONAL,
        noSuitableCellFound-r16    ENUMERATED {true}
OPTIONAL,
        ...,
        [[
        cli-RLF-Report-v1610        MeasResultCLI-r16-v1610
OPTIONAL
        ]]
    },
    eutra-RLF-Report-r16            SEQUENCE {
        failedPCellId-EUTRA          CGI-InfoEUTRALogging,
        measResult-RLF-Report-EUTRA-r16  OCTET STRING
    }
}

MeasResultList2NR-r16 ::=   SEQUENCE(SIZE (1..maxFreq)) OF
MeasResult2NR-r16
```

```
MeasResultList2EUTRA-r16 ::= SEQUENCE(SIZE (1..maxFreq)) OF
MeasResult2EUTRA-r16

MeasResult2NR-r16 ::=          SEQUENCE {
ssbFrequency-r16               ARFCN-ValueNR
OPTIONAL,
refFreqCSI-RS-r16              ARFCN-ValueNR
OPTIONAL,
measResultList-r16             MeasResultListNR
}

MeasResultListLogging2NR-r16 ::=  SEQUENCE(SIZE (1..maxFreq)) OF
MeasResultListLoggingNR-r16
MeasResultListLoggingNR-r16 ::=  SEQUENCE (SIZE
(1..maxCellReport)) OF MeasResultLoggingNR-r16

MeasResultLoggingNR-r16 ::= SEQUENCE {
    physCellId-r16             PhysCellId,
    resultsSSB-Cell-r16        MeasQuantityResults,
    numberOfGoodSSB-r16        INTEGER (1..maxNrofSSBs)
OPTIONAL
}

MeasResult2EUTRA-r16 ::=     SEQUENCE {
    carrierFreq-r16             ARFCN-ValueEUTRA,
    measResultList-r16          MeasResultListEUTRA
}

MeasResultRLFNR-r16 ::=      SEQUENCE {
    measResult-r16                SEQUENCE {
        cellResults-r16           SEQUENCE{
            resultsSSB-Cell-r16     MeasQuantityResults
OPTIONAL,
            resultsCSI-RS-Cell-r16  MeasQuantityResults
OPTIONAL
        },
        rsIndexResults-r16        SEQUENCE{
            resultsSSB-Indexes-r16 ResultsPerSSB-IndexList
OPTIONAL,
            ssbRLMConfigBitmap-r16 BIT STRING (SIZE (64))
OPTIONAL,
            resultsCSI-RS-Indexes-r16  ResultsPerCSI-RS-IndexList
OPTIONAL,
            csi-rsRLMConfigBitmap-r16  BIT STRING (SIZE (96))
OPTIONAL
        }
OPTIONAL
    }
}

TimeSinceFailure-r16 ::=     INTEGER (0..172800)
```

```
MobilityHistoryReport-r16  ::=    VisitedCellInfoList-r16

-- TAG-UEINFORMATIONRESPONSE-STOP
-- ASN1STOP
```

| *UEInformationResponse* field descriptions |
|---|
| *logMeasReport* |
| This field is used to provide the measurement results stored by the UE associated to logged MDT. |
| *ra-Report* |
| This field is used to provide the list of RA reports that is stored by the UE for the past up to *maxRAReport* number of successful random access procedures. |
| *rlf-Report* |
| This field is used to indicate the RLF report related contents. |

| *LogMeasReport* field descriptions |
|---|
| *absoluteTimeStamp* |
| Indicates the absolute time when the logged measurement configuration logging is provided, as indicated by E-UTRAN within *absoluteTimeInfo*. |
| *logMeasResultListBT* |
| This field refers to the Bluetooth measurement results. |
| *logMeasResultListWLAN* |
| This field refers to the WLAN measurement results. |
| *measResultServCell* |
| This field refers to the log measurement results taken in the Serving cell. |
| *relativeTimeStamp* |
| Indicates the time of logging measurement results, measured relative to the *absoluteTimeStamp*. Value in seconds. |
| *tce-Id* |
| Parameter Trace Collection Entity Id: See TS 32.422 [x4]. |
| *timeStamp* |
| Includes time stamps for the waypoints that describe planned locations for the UE. |
| *traceRecordingSessionRef* |
| Parameter Trace Recording Session Reference: See TS 32.422 [x4]. |

| *ConnEstFailReport* field descriptions |
|---|
| *measResultFailedCell* |
| This field refers to the last measurement results taken in the cell, where connection establishment failure happened. |
| *measResultNeighCells* |
| This field refers to the neighbour cell measurements when connection establishment failure happened. |
| *numberOfConnFail* |
| This field is used to indicate the number of failed connection setup attempts after radio link failure. |
| *numberOfPreamblesSent* |

| This field is used to indicate the number of random access preambles that were transmitted. |
|---|
| maxTxPowerReached<br>This field is used to indicate whether or not the maximum power level was used for the last transmitted preamble. |
| timeSinceFailure<br>This field is used to indicate the time that elapsed since the connection (establishment) failure. Value in seconds. The maximum value 172800 means 172800s or longer. |

| RA-Report field descriptions |
|---|
| absoluteFrequencyPointA<br>This field indicates the absolute frequency position of the reference resource block (Common RB 0). |
| cellID<br>This field indicates the CGI of the cell in which the associated random access procedure was performed. |
| contentionDetected<br>This field is used to indicate that contention was detected for the transmitted preamble in the given random access attempt or not. |
| csi-RS-Index<br>This field is used to indicate the CSI-RS index corresponding to the random access attempt. |
| dlRSRPAboveThreshold<br>This field is used to indicate whether the DL beam (SSB or CSI-RS) quality associated to the random access attempt was above or below the threshold (*rsrp-ThresholdSSB* when NUL is used and *rsrp-ThresholdSSB-SUL* when SUL is used). |
| locationAndBandwidth<br>Frequency domain location and bandwidth of the bandwidth part associated to the random-access resources used by the UE. |
| msg1-FrequencyStart<br>Offset of lowest PRACH transmission occasion in frequency domain with respective to PRB 0 of the UL BWP. |
| msg1-SubcarrierSpacing<br>Subcarrier spacing of PRACH resources. |
| numberOfPreamblesSentOnCSI-RS<br>This field is used to indicate the total number of successive RA preambles that were transmitted on the corresponding CSI-RS. |
| numberOfPreamblesSentOnSSB<br>This field is used to indicate the total number of successive RA preambles that were transmitted on the corresponding SSB/PBCH block. |
| perRAAttemptInfoList<br>This field provides detailed information about a random access attempt. |
| perRAInfoList<br>This field provides detailed information about each of the random access attempts in the chronological order of the random access attempts. |
| perRACSI-RSInfoList |

| This field provides detailed information about the successive random access attempts associated to the same CSI-RS. |
| --- |
| *perRASSBInfoList*<br>This field provides detailed information about the successive random access attempts associated to the same SS/PBCH block. |
| *raPurpose*<br>This field is used to indicate the RA scenario for which the RA report entry is triggered. The RA accesses associated to Initial access from RRC_IDLE, transition from RRC-INACTIVE and the MSG3 based SI request are indicated using the indicator 'accessRelated'. |
| *ssb-Index*<br>This field is used to indicate the SS/PBCH index of the SS/PBCH block corresponding to the random access attempt. |
| *ssbRSRPQualityIndicator*<br>This field is used to indicate the SS/PBCH RSRP of the SS/PBCH block corresponding to the random access attempt is above *rsrp-ThresholdSSB* or not. |
| *subcarrierSpacing*<br>Subcarrier spacing used in the BWP associated to the random-access resources used by the UE. |

| ***RLF-Report* field descriptions** |
| --- |
| *connectionFailureType*<br>This field is used to indicate whether the connection failure is due to radio link failure or handover failure. |
| *csi-rsRLMConfigBitmap*<br>This field is used to indicate the CSI-RS indexes that are also part of the RLM configurations. |
| *c-RNTI*<br>This field indicates the C-RNTI used in the PCell upon detecting radio link failure or the C-RNTI used in the source PCell upon handover failure. |
| *failedCellId*<br>This field is used to indicate the cell in which connection establishment failed. |
| *failedPCellId*<br>This field is used to indicate the PCell in which RLF is detected or the target PCell of the failed handover. The UE sets the ARFCN according to the frequency band used for transmission/ reception when the failure occurred. |
| *failedPCellId-EUTRA*<br>This field is used to indicate the PCell in which RLF is detected or the target PCell of the failed handover in an E-UTRA RLF report. |
| *measResultLastServCell*<br>This field refers to the last measurement results taken in the PCell, where radio link failure or handover failure happened. |
| *measResultListEUTRA*<br>This field refers to the last measurement results taken in the neighboring EUTRA Cells, when the radio link failure or handover failure happened. |
| *measResultListNR*<br>This field refers to the last measurement results taken in the neighboring NR Cells, when the radio link failure or handover failure happened. UE does not include the |

| |
|---|
| resultsSSB-Indexes IE, if the measResultListNR IE is included in the LogMeasInfo-r16 IE. |
| measResultServCell<br>This field refers to the log measurement results taken in the Serving cell. |
| measResult-RLF-Report-EUTRA<br>Includes the E-UTRA *RLF-Report-r9* IE as specified in TS 36.331 [10]. |
| noSuitableCellFound<br>This field is set by the UE when the T311 expires. |
| previousPCellId<br>This field is used to indicate the source PCell of the last handover (source PCell when the last *RRCReconfiguration* message including *reconfigurationWithSync* was received). |
| reestablishmentCellId<br>This field is used to indicate the cell in which the re-establishment attempt was made after connection failure. |
| rlf-Cause<br>This field is used to indicate the cause of the last radio link failure that was detected. In case of handover failure information reporting (i.e., the *connectionFailureType* is set to '*hof*'), the UE is allowed to set this field to any value. |
| ssbRLMConfigBitmap<br>This field is used to indicate the SS/PBCH block indexes that are also part of the RLM configurations. |
| timeConnFailure<br>This field is used to indicate the time elapsed since the last HO initialization until connection failure. Actual value = field value * 100ms. The maximum value 1023 means 102.3s or longer. |
| timeSinceFailure<br>This field is used to indicate the time that elapsed since the connection (establishment) failure. Value in seconds. The maximum value 172800 means 172800s or longer. |

*** END Example amendments to 3GPP TS 38.331, v. 16.0.0 ***

Figure 6:
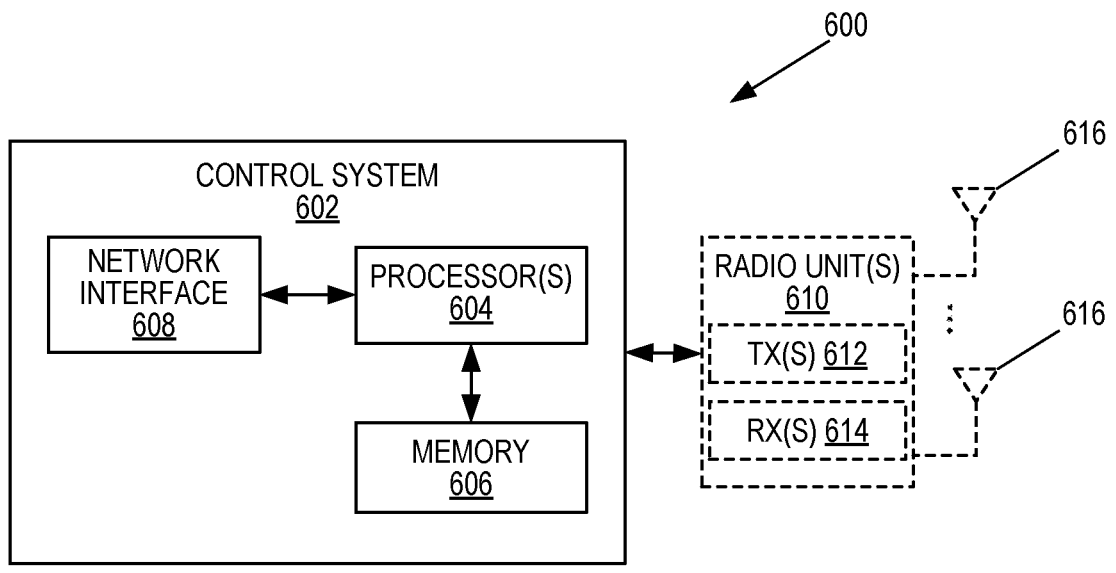
FIG. 6 is a schematic block diagram of a network node according to some embodiments of the present disclosure.

FIG. 6 is a schematic block diagram of a network node 600 according to some embodiments of the present disclosure. Optional features are represented by dashed boxes. The network node 600 may be, for example, a base station 302 or 306 or a network node that implements all or part of the functionality of the base station 302 or gNB described herein. As illustrated, the network node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. In addition, the network node 600 may include one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a network node 600 as described herein. In some embodiments, the function(s) are implemented in software that is stored, e.g., in the memory 606 and executed by the one or more processors 604.

Figure 7:
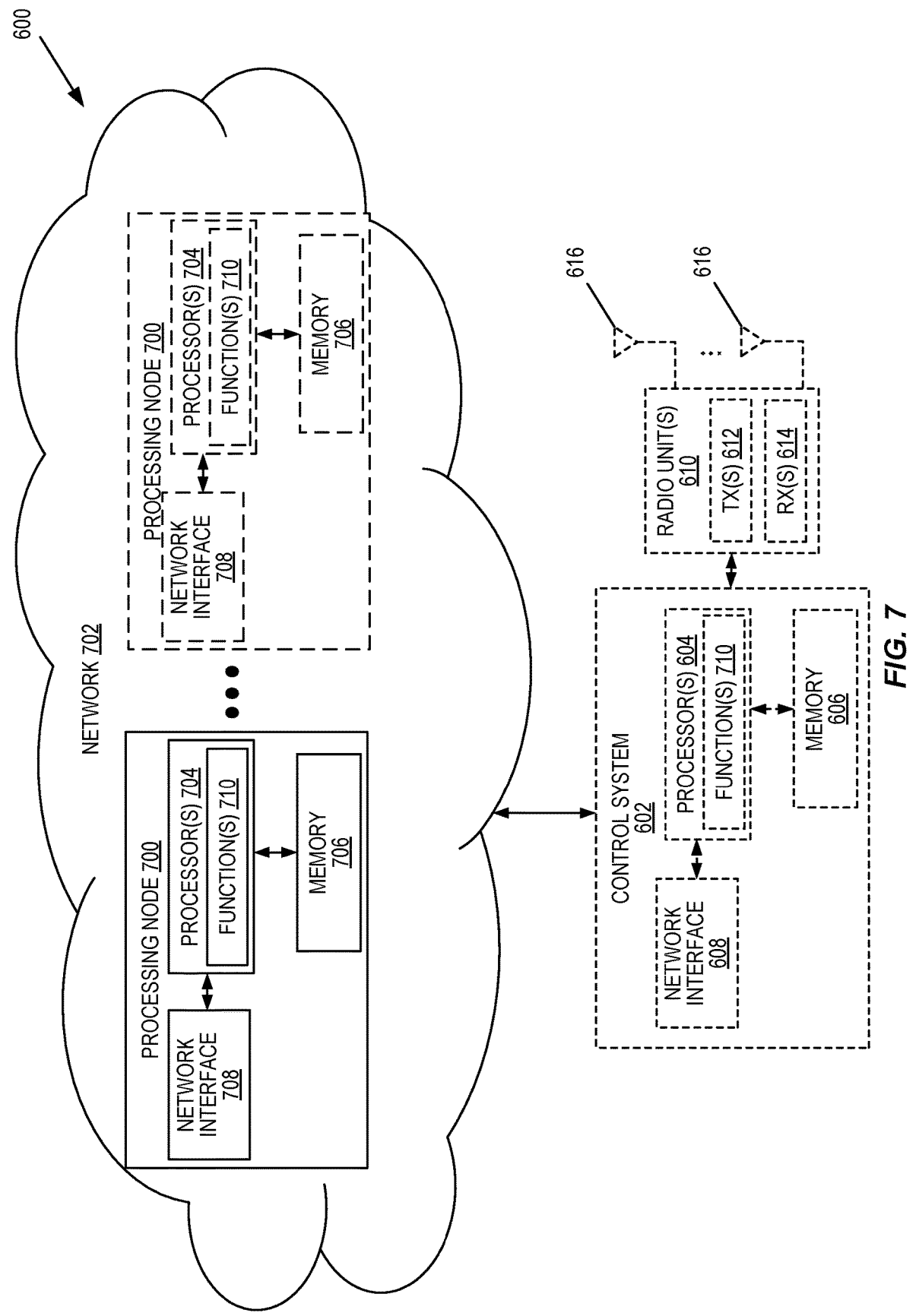
FIG. 7 is a schematic block diagram that illustrates a virtualized embodiment of the network node according to some embodiments of the present disclosure.

FIG. 7 is a schematic block diagram that illustrates a virtualized embodiment of the network node 600 according to some embodiments of the present disclosure. This discussion is equally applicable to other types of network nodes. Further, other types of network nodes may have similar virtualized architectures. Again, optional features are represented by dashed boxes.

As used herein, a "virtualized" network node is an implementation of the network node 600 in which at least a portion of the functionality of the network node 600 is implemented as a virtual component(s) (e.g., via a virtual machine(s) executing on a physical processing node(s) in a network(s)). As illustrated, in this example, the network node 600 may include the control system 602 and/or the one or more radio units 610, as described above. The control system 602 may be connected to the radio unit(s) 610 via, for example, an optical cable or the like. The network node 600 includes one or more processing nodes 700 coupled to or included as part of a network(s) 702. If present, the control system 602 or the radio unit(s) 610 are connected to the processing node(s) 700 via the network 702. Each processing node 700 includes one or more processors 704 (e.g., CPUs, ASICs, FPGAs, and/or the like), memory 706, and a network interface 708.

In this example, functions 710 of the network node 600 described herein are implemented at the one or more processing nodes 700 or distributed across the one or more processing nodes 700 and the control system 602 and/or the radio unit(s) 610 in any desired manner. In some particular embodiments, some or all of the functions 710 of the network node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicate directly with the processing node(s) 700 via an appropriate network interface(s).

In some embodiments, a computer program including instructions which, when executed by at least one processor, causes the at least one processor to carry out the functionality of network node 600 or a node (e.g., a processing node 700) implementing one or more of the functions 710 of the network node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
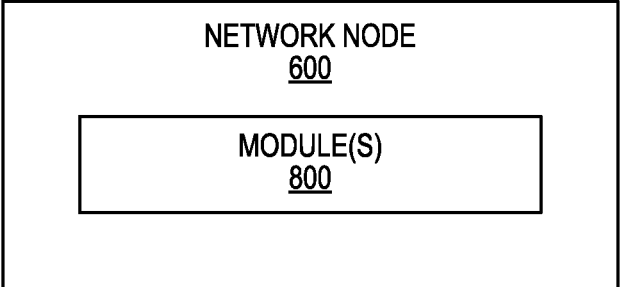
FIG. 8 is a schematic block diagram of the network node according to some other embodiments of the present disclosure.

FIG. 8 is a schematic block diagram of the network node 600 according to some other embodiments of the present disclosure. The network node 600 includes one or more modules 800, each of which is implemented in software. The module(s) 800 provide the functionality of the network node 600 described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Figure 9:
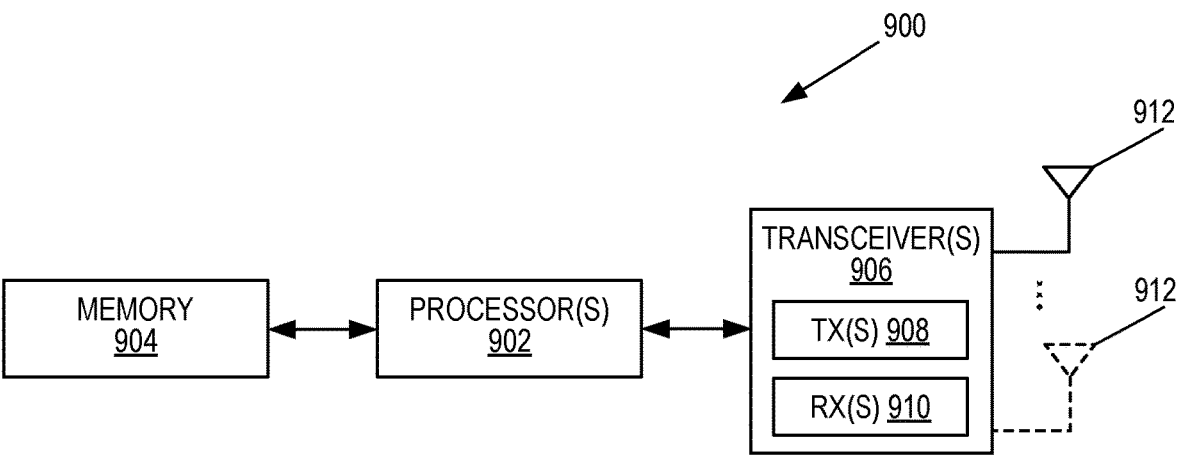
FIG. 9 is a schematic block diagram of a wireless communication device 900 according to some embodiments of the present disclosure.

FIG. 9 is a schematic block diagram of a wireless communication device 900 according to some embodiments of the present disclosure. As illustrated, the wireless communication device 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the wireless communication device 900 described above may be fully or partially implemented in software that is, e.g., stored in the memory 904 and executed by the processor(s) 902. Note that the wireless communication device 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the wireless communication device 900 and/or allowing output of information from the wireless communication device 900), a power supply (e.g., a battery and associated power circuitry), etc.

In some embodiments, a computer program including instructions which, when executed by at least one processor, causes the at least one processor to carry out the functionality of the wireless communication device 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
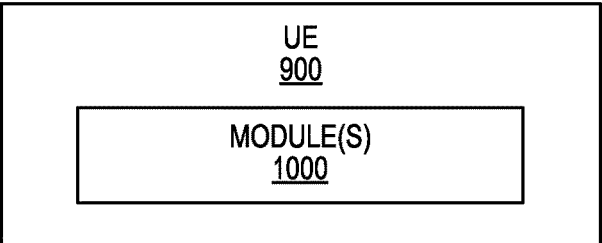
FIG. 10 is a schematic block diagram of the wireless communication device according to some other embodiments of the present disclosure.

FIG. 10 is a schematic block diagram of the wireless communication device 900 according to some other embodiments of the present disclosure. The wireless communication device 900 includes one or more modules 1000, each of which is implemented in software. The module(s) 1000 provide the functionality of the wireless communication device 900 described herein.

FIG. 11 is a flowchart illustrating a method in accordance with particular embodiments. This method may be performed by a UE. The method optionally begins at step 1100 with receiving a measurement configuration (e.g., from a network node) indicating that the UE shall store CLI measurements in case of handover (e.g., a handover procedure for the wireless device). The method continues at step 1102 with storing CLI measurements for reporting after handover failure/success. The method optionally continues at step 1104 with transmitting (e.g., to a source gNB) an indication that stored CLI measurement report information is available. The method further continues at step 1106 with receiving an indication to report CLI measurements for radio link failure. The method further continues at step 1108 with transmitting (e.g., to the source gNB) CLI measurement information (e.g., in association with a notification of a radio link failure).

FIG. 12 is a flowchart illustrating a method in accordance with particular embodiments. This method may be performed by a network node (e.g., a gNB or another network node involved in a handover). The method optionally begins at step 1200 with sending a measurement configuration to a UE that indicates that the UE is to store CLI measurements in case of handover. The method optionally continues at step 1202 with receiving, from the UE, an indication that stored CLI measurement report information is available at the UE. The method continues at step 1204 with transmitting, to the UE, an indication to report CLI measurements for radio link failure. The method continues at step 1206 with receiving CLI measurement information (e.g., one or more CLI measurements) from the UE (e.g., in association with a notification of a radio link failure). The method optionally continues at step 1208 with transmitting at least a portion of the received CLI measurement information (e.g., at least one of the received CLI measurements) to a target network node (e.g., a target gNB as part of a handover process). The method optionally continues at step 1210 with receiving an acknowledgement for sending a handover command to the UE. The method continues at step 1212 with transmitting a RRC reconfiguration to the UE.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

Embodiment 1: A method performed by a wireless device for CLI reporting, the method comprising one or more of:
  storing a CLI measurement;
  receiving a request to report the CLI measurement from a network node involved in a handover procedure; and
  transmitting a CLI measurement report to the network node based on the CLI measurement.

Embodiment 2: The method of embodiment 1, wherein storing the CLI measurement comprises storing the CLI measurement in response to receiving a measurement configuration.

Embodiment 3: The method of embodiment 2, wherein the measurement configuration indicates the wireless device shall store the CLI measurement in case of a handover.

Embodiment 4: The method of any of embodiments 2 to 3, wherein the measurement configuration is received in a RRCReconfiguration message.

Embodiment 5: The method of any of embodiments 1 to 4, further comprising transmitting an indication that CLI measurement information is available after storing the CLI measurement.

Embodiment 6: The method of embodiment 5, wherein the indication that the CLI measurement information is available is transmitted in a RRCReestablishmentComplete message.

Embodiment 7: The method of any of embodiments 1 to 6, wherein the request to report the CLI measurement is received in a UEInformationRequest message, and the CLI measurement report is transmitted in a UEInformationResponse message.

Embodiment 8: The method of any of embodiments 1 to 7, wherein the CLI measurement report is provided in response to a radio link failure during the handover procedure.

Embodiment 9: The method of any of embodiments 1 to 7 wherein the CLI measurement report is provided after successful completion of the handover procedure.

Embodiment 10: The method of any of embodiments 1 to 9, wherein the network node is a gNB.

Embodiment 11: The method of embodiment 10, wherein the network node is a source gNB in the handover procedure Embodiment 12: A UE comprising processing circuitry configured to perform any of the steps of any of embodiments 1 to 11.

Embodiment 13: A method performed by a network node for avoiding CLI, the method comprising one or more of receiving CLI measurement information from a wireless device; and, in a handover procedure, transmitting the CLI measurement information to another network node involved in the handover procedure.

Embodiment 14: The method of embodiment 13, further comprising receiving a handover acknowledgment from the other network node in response to transmitting the CLI measurement information.

Embodiment 15: The method of embodiment 14, wherein the handover acknowledgement comprises radio reconfiguration information.

Embodiment 16: The method of embodiment 15, further comprising transmitting a reconfiguration message to the wireless device based on the radio reconfiguration information.

Embodiment 17: The method of embodiment 16, wherein the reconfiguration message is transmitted as a RRCReconfiguration message.

Embodiment 18: The method of any of embodiments 1 to 17, wherein the CLI measurement information is transmitted to the other network node in a handover request message.

Embodiment 19: The method of any of embodiments 1 to 18, wherein the CLI measurement information is received from the wireless device in a previous handover procedure.

Embodiment 20: The method of any of embodiments 1 to 19, wherein the wireless device providing the CLI measurement is involved in the handover procedure.

Embodiment 21: The method of any of embodiments 1 to 19, wherein the wireless device providing the CLI measurement is not involved in the handover procedure.

Embodiment 22: The method of any of embodiments 1 to 21, wherein the network node is a source gNB in the handover procedure; and the other network node is a target gNB in the handover procedure.

Embodiment 23: A network node comprising processing circuitry configured to perform any of the steps of any of embodiments 13 to 22.

Those skilled in the art will recognize improvements and modifications to the embodiments of the present disclosure. All such improvements and modifications are considered within the scope of the concepts disclosed herein.

The invention claimed is:

1. A method performed by a wireless device for Cross-Link Interference, CLI, reporting, the method comprising:
   storing a CLI measurement;
   receiving a request to report the CLI measurement from a network node involved in a handover procedure for the wireless device; and
   transmitting a CLI measurement report to the network node based on the CLI measurement, wherein the CLI measurement comprises a plurality of CLI resources; and
   wherein storing the CLI measurement comprises storing a subset of CLI resources of the plurality of CLI resources based at least in part on a degree of interference associated with the subset of CLI resources.

2. The method of claim 1, wherein storing the CLI measurement comprises storing the CLI measurement in response to receiving a measurement configuration.

3. The method of claim 2, wherein receiving the measurement configuration comprises receiving the measurement configuration from the network node.

4. The method of claim 2, wherein the measurement configuration indicates the wireless device shall store the CLI measurement in case of a handover.

5. The method of claim 4, wherein:
   the measurement configuration further indicates that the case of the handover is a handover from a first network node to a second network node; and
   wherein the handover procedure for the wireless device comprises a handover procedure from the network node to a second network node.

6. The method of claim 2, wherein the measurement configuration is received in a RRCReconfiguration message.

7. The method of claim 1, further comprising transmitting an indication that CLI measurement information is available after storing the CLI measurement.

8. The method of claim 7, wherein transmitting the indication that the CLI measurement information is available comprises transmitting, to the network node, an indication that CLI measurement information is available after storing the CLI measurement; and
   wherein the indication comprises:
      (a) a flag associated with a Radio Link Failure, RLF, reporting framework; or
      (b) a CLI-specific indication.

9. The method of claim 7, wherein the indication that the CLI measurement information is available is transmitted in a RRCReestablishmentComplete message.

10. The method of claim 1, wherein:
   the request to report the CLI measurement is received in a UEInformationRequest message; and
   the CLI measurement report is transmitted in a UEInformationResponse message.

11. The method of claim 1, wherein the CLI measurement report is provided in response to a radio link failure during the handover procedure.

12. The method of claim 1, wherein the CLI measurement report is provided after successful completion of the handover procedure.

13. The method of claim 1, wherein the network node is a New Radio Base Station, gNB.

14. The method of claim 13, wherein the network node is a source gNB in the handover procedure for the wireless device.

15. The method of claim 1, wherein the CLI measurement comprises a plurality of CLI resources, and wherein the CLI measurement report is descriptive of a subset of the plurality of CLI resources.

16. The method of claim 15, wherein the subset of CLI resources is associated with:
   (a) a certain frequency range;
   (b) one or more specific interferers that are close to a resource in which random access attempts and subsequent messages are transmitted; and/or
   (c) a time at which the subset of CLI resources were collected.

17. The method of claim 1, wherein the request to report the stored CLI measurement from the network node comprises a request to report the stored CLI measurement within (a) a RLF report or (b) a CLI-specific container.

18. The method of claim 1, wherein the CLI measurement comprises a measurement of interference, at the wireless device, between neighboring cells due to different transmission directions on the neighboring cells on the same or partially-overlapping time-frequency resources.

19. A User Equipment, UE, comprising:
   one or more transmitters;
   one or more receivers; and
   processing circuitry configured to cause the UE to:
      i. store a CLI measurement;
      ii. receive a request to report the CLI measurement from a network node involved in a handover procedure for the wireless device; and
      iii. transmit a CLI measurement report to the network node based on the CLI measurement, wherein the CLI measurement comprises a plurality of CLI resources; and
      wherein storing the CLI measurement comprises storing a subset of CLI resources of the plurality of CLI resources based at least in part on a degree of interference associated with the subset of CLI resources.

* * * * *